(12) United States Patent
Dass et al.

(10) Patent No.: US 12,402,184 B2
(45) Date of Patent: Aug. 26, 2025

(54) THREAD DEVICE ECO-SYSTEM DESIGN

(71) Applicant: Apple Inc., Cupertino, CA (US)

(72) Inventors: Yaranama Venkata Ramana Dass, Cupertino, CA (US); Camille Chen, Cupertino, CA (US); Hsin-Yao Chen, Castro Valley, CA (US); Paul V Flynn, Menlo Park, CA (US); Sarvesh Kumar Varatharajan, Cupertino, CA (US); Ye Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 482 days.

(21) Appl. No.: 17/874,130

(22) Filed: Jul. 26, 2022

(65) Prior Publication Data
US 2023/0100850 A1    Mar. 30, 2023

Related U.S. Application Data

(60) Provisional application No. 63/248,285, filed on Sep. 24, 2021.

(51) Int. Cl.
| | | |
|---|---|---|
| *H04W 72/04* | (2023.01) | |
| *H04W 76/14* | (2018.01) | |
| *H04W 76/15* | (2018.01) | |
| *H04W 76/18* | (2018.01) | |
| *H04W 76/19* | (2018.01) | |
| *H04W 84/18* | (2009.01) | |

(52) U.S. Cl.
CPC .......... *H04W 76/14* (2018.02); *H04W 76/15* (2018.02); *H04W 76/18* (2018.02); *H04W 76/19* (2018.02); *H04W 84/18* (2013.01)

(58) Field of Classification Search
CPC ..... H04W 76/14; H04W 76/15; H04W 76/18; H04W 76/19; H04W 84/18; H04W 88/06
See application file for complete search history.

(56) References Cited

U.S. PATENT DOCUMENTS

| | | | |
|---|---|---|---|
| 9,160,568 B2 | 10/2015 | Sargent | |
| 10,841,382 B2 | 11/2020 | Somaraju | |
| 11,510,163 B2 | 11/2022 | Hui | |
| 2004/0209593 A1* | 10/2004 | Alberth, Jr. ........... | H04W 48/18 455/435.2 |
| 2008/0198807 A1 | 8/2008 | Xia | |
| 2009/0196210 A1* | 8/2009 | Desai ................ | H04W 52/0225 370/311 |
| 2014/0204802 A1* | 7/2014 | Han ..................... | H04W 76/10 370/255 |

(Continued)

OTHER PUBLICATIONS

"Thread Stack Fundamentals"; Thread Group; 21 pages; Jul. 13, 2015.

(Continued)

*Primary Examiner* — Mahbubul Bar Chowdhury
(74) *Attorney, Agent, or Firm* — Kowert, Hood, Munyon, Rankin & Goetzel, P.C.

(57) ABSTRACT

Systems, methods, and mechanisms to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

20 Claims, 19 Drawing Sheets

(56) References Cited

U.S. PATENT DOCUMENTS

| | | | | |
|---|---|---|---|---|
| 2016/0119931 | A1* | 4/2016 | Soriaga | H04W 52/0219 |
| | | | | 370/329 |
| 2019/0174418 | A1* | 6/2019 | Kencharla | H04W 52/0216 |
| 2020/0329426 | A1* | 10/2020 | Jin | G06F 9/4418 |
| 2021/0385771 | A1* | 12/2021 | Hui | H04L 43/10 |
| 2022/0182915 | A1* | 6/2022 | Zhou | H04W 40/12 |
| 2023/0199610 | A1 | 6/2023 | Hui | |
| 2024/0388357 | A1* | 11/2024 | Mäder | H04B 7/18506 |

OTHER PUBLICATIONS

Thread Group "Thread Network Fundamentals", 22 pages, May 2020.

Zimmermann "Development of Thread-compatible Open Source Stack", IOP Publishing, 9 pages, 2017.

\* cited by examiner

| Frame | Bytes | Duration [ms] |
|---|---|---|
| Beacon | 61 | 1.952 |
| ACK | 11 | 0.352 |
| Command | ~ | ~ |
| Data | 133 | 4.256 |
| Beacon Request | 15 | 0.480 |

FIG. 4

| Field Name | Type | Comments |
|---|---|---|
| Vendor ID | 16 | |
| Vendor Data | 16 | [bit0-bit3] – already used<br>[bit4-bit7] – confidence factor |

*FIG. 7*

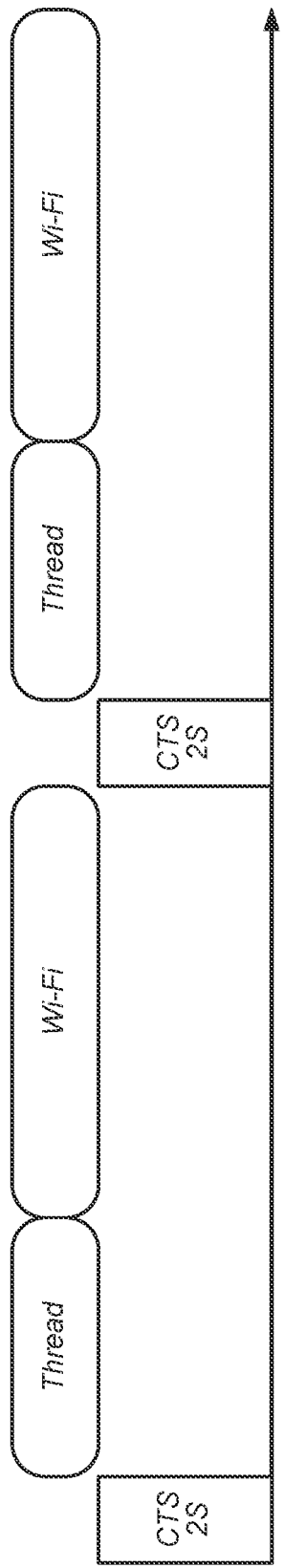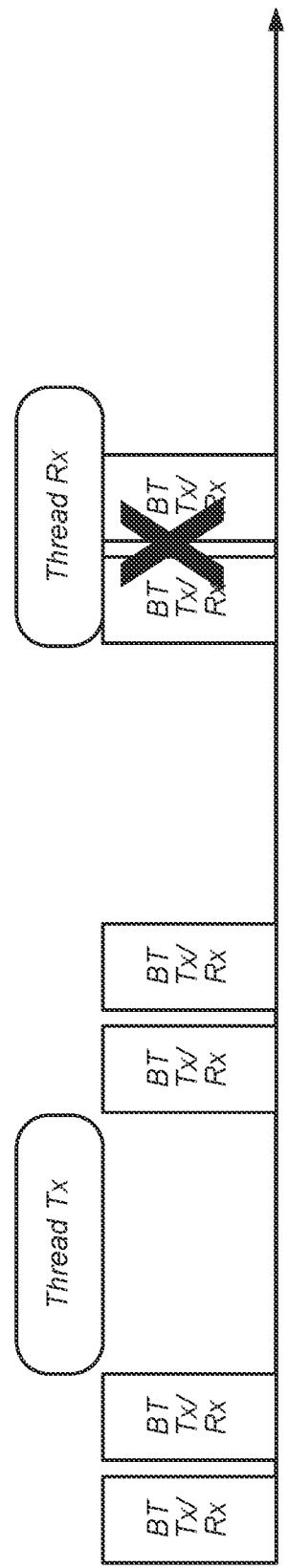

THREAD DEVICE ECO-SYSTEM DESIGN

PRIORITY DATA

This application claims benefit of priority to U.S. Provisional Application Ser. No. 63/248,285, titled "Optimized Eco-system Design with Thread Devices", filed Sep. 24, 2021, which is hereby incorporated by reference in its entirety as though fully and completely set forth herein.

FIELD

The present application relates to wireless communications, including techniques for wireless communication among wireless stations in wireless networking systems.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

Additionally, software frameworks have been introduced to allow users to configure, communicate with, and control smart home appliances (e.g., such as light bulbs, sensors, door locks, IP cameras, smoke alarms, power outlets, and so forth) using Wi-Fi and/or Bluetooth protocols. However, while Bluetooth and Wi-Fi are good wireless technology candidates for connected home appliances (e.g., smart devices) as these technologies are proven provide good functionality, with the ever-growing number of smart devices within a home, it became clear that a mesh network would be more suitable to connect these smart devices. Wi-Fi and Bluetooth both have basic mesh network designs, they cannot compete with Thread technology which is built on top of a mesh network.

Thread is an IPv6-based, low power mesh networking technology for Internet-of-Things (IoT) products (e.g., smart devices) and is intended to be secure and future-proof. In July 2014, a "Thread Group" alliance was formed as a working group to aid Thread becoming an industry standard by providing Thread certification for products. Thread is designed in the 2.4 GHz band which is also occupied by both Wi-Fi and Bluetooth, thus Thread may at times interfere with and/or be interfered by both Wi-Fi and Bluetooth signals. Additionally, some smart devices may be required to operate with both Thread and Wi-Fi/Bluetooth (e.g., to support other functionality such as high-definition video streaming, low latency audio, multiple game controllers, and/or spatial audio). As a result, solutions are required to better integrate and/or allow Thread to co-exist with Wi-Fi and Bluetooth.

SUMMARY

Embodiments described herein relate to systems and methods to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

For example, in some embodiments, a wireless station may be configured to receive a mesh link establishment request from a neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. T As another example, in some embodiments, a wireless station may be configured to receive a mesh link establishment request from a neighboring wireless station and wait for a retransmission, from the neighboring wireless station, of the mesh link establishment request before transmitting a mesh link establishment response. Additionally, the wireless station may be configured to receive, from the neighboring wireless station, the retransmission of the mesh link establishment request.

As a further example, in some embodiments, a wireless station may be configured to receive a mesh link establishment request from a neighboring wireless station and determine, based, at least in part, on the connection data, to deter establishment of mesh links and adjust a link quality metric to generate the adjusted link quality metric. Additionally, the wireless station may be configured to transmit, to the neighboring wireless station, an adjusted link quality metric in the mesh link establishment response As a yet further example, in some embodiments, a wireless station may be configured to transmit mesh link establishment requests to a plurality of neighboring wireless stations and receive, from the plurality of neighboring wireless stations, mesh link establishment responses that include confidence factors in vendor TLVs. In addition, the wireless station may be configured to determine, based, at least in part, on a first confidence factor associated with the neighboring wireless station, to connect to the neighboring wireless station.

As an additional example, in some embodiments, a wireless station may be configured to transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

As another example, in some embodiments, a wireless station may be configured to transmit mesh link establishment requests to a plurality of neighboring wireless stations and receive, from a subset of the plurality of neighboring wireless stations, mesh link establishment responses that include confidence factors in vendor TLVs. Additionally, the wireless station may be configured to, in response to determining that none of the subset of the plurality of neighboring wireless stations are appropriate for connection, retransmit, to at least one neighboring wireless station (e.g., which did not send a mesh link establishment response), the mesh link establishment request. In some instances, the wireless station may be configured to wait a delay period prior to retransmitting the mesh link establishment request.

As an additional example, in some embodiments, a wireless station may be configured to establish a mesh link connection with the neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

As a yet further example, in some embodiments, a wireless station may be configured to establish a mesh link connection with the neighboring wireless station and determine that a duration of time between transmission of protected management frames by a second radio of the one or more radios has exceeded a threshold. The threshold may be pre-configured and/or specified. Further, the wireless station may be configured to suppress (e.g., not protect, not allow, and/or cancel) reception of data by the first radio via the mesh link connection for a period of time. The period of time may be pre-configured and/or specified.

As yet another example, in some embodiments, a wireless station may be configured to establish a mesh link connection with the neighboring wireless station and determine that a duration of time between transmission of protected management frames by a second radio of the one or more radios has exceeded a threshold. The threshold may be pre-configured and/or specified. Further, the wireless station may be configured to suppress (e.g., not protect, not allow, and/or cancel) reception of data by the first radio via the mesh link connection until the first radio confirms a data packet intended for the first radio is being transmitted. The threshold may be pre-configured and/or specified.

As another additional example, in some embodiments, a wireless station may be configured to establish a mesh link connection with the neighboring wireless station and deny reception requests for the mesh link connection based, at least in part, on determining that a mode of operation of a second radio of the one or more radios is a critical mode of operation. Further, the wireless station may be configured to utilize a retry mechanism to maintain performance of the mesh link.

As an additional example, in some embodiments, a wireless station may be configured to establish a mesh link connection with the neighboring wireless station and determine that a second radio of the one or more radios has on-going traffic that interferes with the mesh link connection. Further, the wireless station may be configured to periodically transmit, from the second radio, a clear-to-send-to-self (CTS2S) frame to allow the first radio to access the medium. The CTS2S frame may generate an unsolicited grant period for the first radio.

As a further additional example, in some embodiments, a wireless station may be configured to establish a mesh link connection with the neighboring wireless station and determine that a second radio of the one or more radios has on-going traffic that interferes with the mesh link connection. Further, the wireless station may be configured to time division duplex transmissions and/or receptions of the mesh link connection with transmissions and/or receptions of the second radio.

As a further example, in some embodiments, a wireless station may be configured to establish a mesh link connection with the neighboring wireless station and compute active frequency hopping (AFH) and a channel masking for channels used by the first radio. Further, the wireless station may be configured to apply the AFH and the channel masking to at least one radio of the one or more additional radios. In addition, the wireless station may be configured to determine a start of activity on at the least one radio and increase an energy detection threshold associated with the first radio.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4 illustrates an example of Thread packet types, sizes, and durations, according to some embodiments.

FIG. 7 illustrates an example of a vendor TLV for Thread, according to some embodiments.

FIG. 11 illustrates an example of Thread and Wi-Fi TDD coexistence, according to some embodiments.

FIG. 12 illustrates an example of Thread and Bluetooth TDD coexistence, according to some embodiments.

Figure 1:
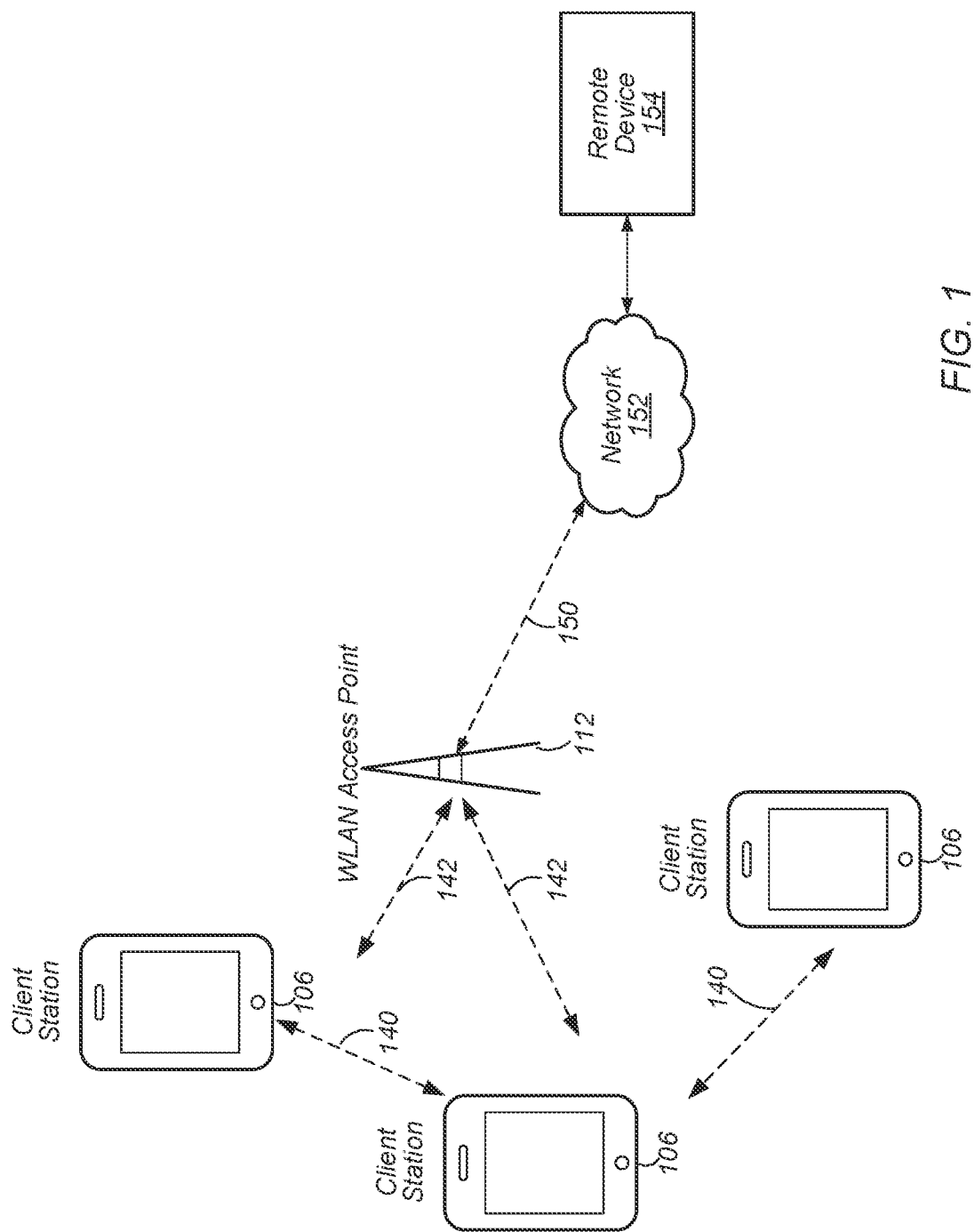
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
 UE: User Equipment
 AP: Access Point
 DL: Downlink (from BS to UE)
 UL: Uplink (from UE to BS)
 TX: Transmission/Transmit
 RX: Reception/Receive
 LAN: Local Area Network
 WLAN: Wireless LAN
 RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™ etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™ Amazon FireTV™, Google Chromecast™, etc.), refrigerators, laundry machines, thermostats, and so forth.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short-range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

Figure 2:
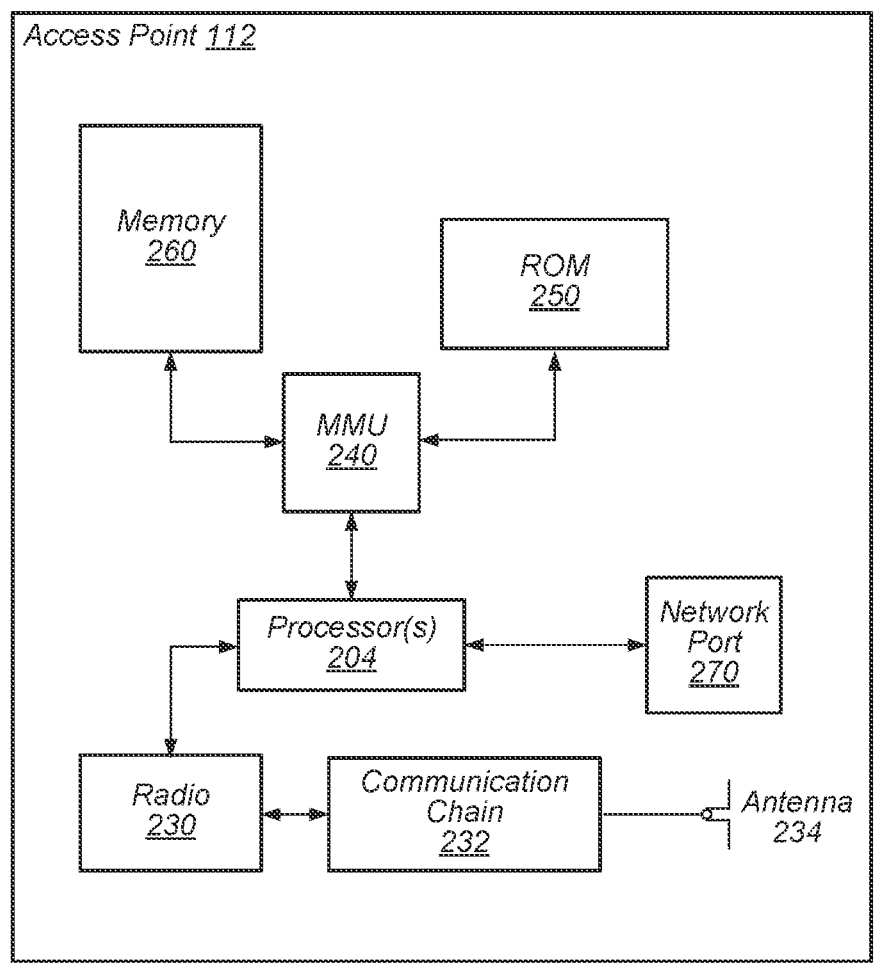
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

Figure 3:
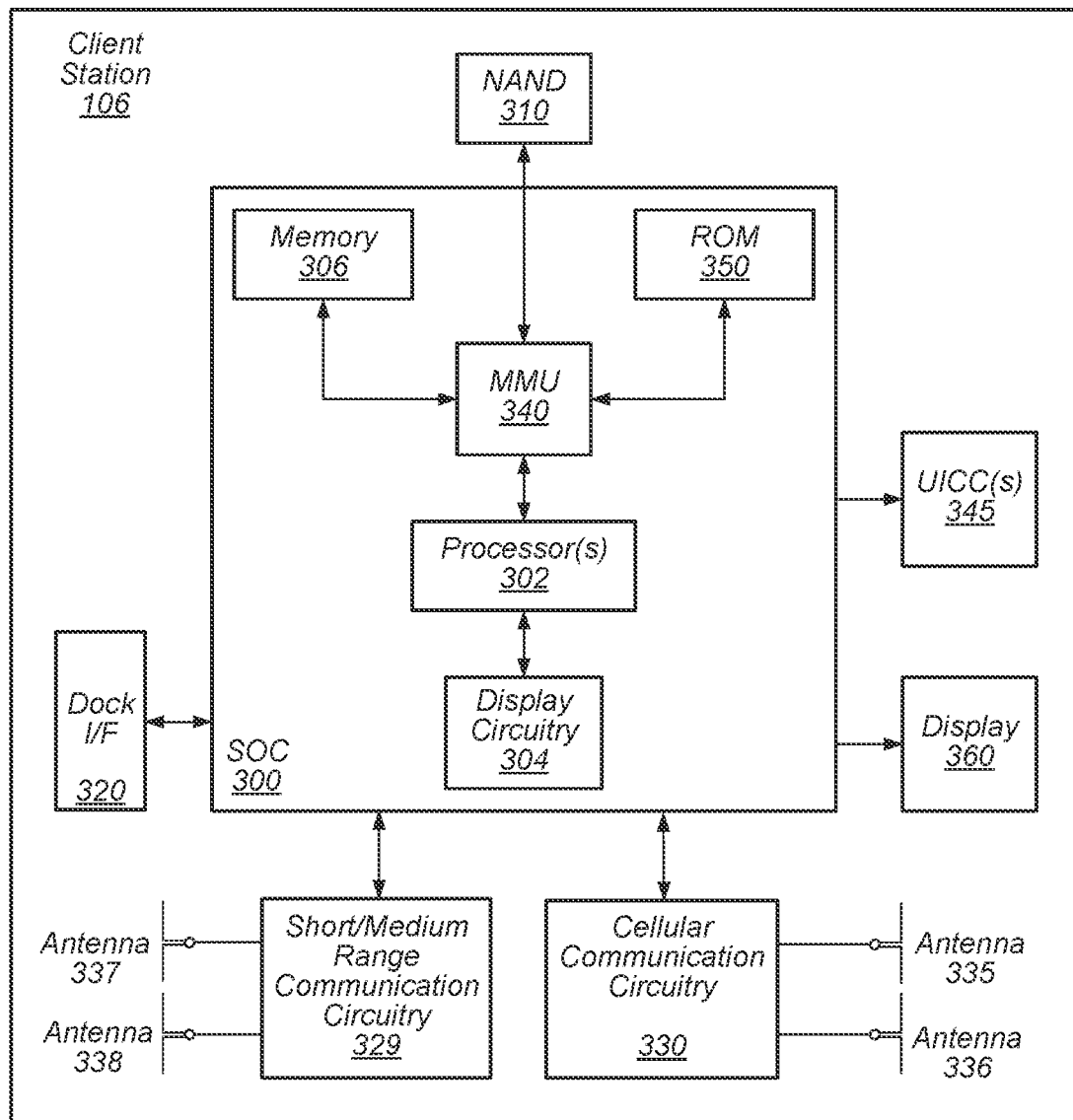
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ Thread, and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short-range wireless communication circuitry 329 may each include one or more processing elements. In other words, one or more processing elements may be included in cellular communication circuitry 330 and also in short range wireless communication circuitry 329. Thus, each of cellular communication circuitry 330 and short-range wireless communication circuitry 329 may include one or more integrated circuits (ICs) that are configured to perform the functions of cellular communication circuitry 330 and short-range wireless communication circuitry 329, respectively. In addition, each integrated circuit may include circuitry (e.g., first circuitry, second circuitry, etc.) configured to perform the functions of cellular communication circuitry 330 and short-range wireless communication circuitry 329.

Thread Protocol

Thread protocol is based on IEEE 802.15.4 which provides definition of medium access control (MAC) and physical layers for low rate, wireless personal area networks (LR-WPANS). The Thread protocol uses a 2.4 GHz band physical layer to support bit rates of up to 250 kilobytes per second (Kbps). Additionally, the Thread protocol is designed to use channels 11 to 26 in the 2.4 to 2.4835 GHz range. Each channel has a 2 MHz bandwidth. Further, channel access is based on carrier sense multiple access with collision avoidance (CSMA-CA). As illustrated by FIG. 4, typical packet types and sizes for the Thread protocol include beacon frames (61 bytes, 1.952 milliseconds (ms)), acknowledgement (ACK) frames (11 bytes, 0.352 ms), command frames (variable bytes and lengths), data frames (133 bytes, 4.256 ms), and beacon request frames (15 bytes, 0.480 ms).

Within the Thread protocol, devices may be either a router device or an end device. A router device may forward packets for network devices (e.g., such as end devices and/or other router devices) and provide secure commissioning services for devices attempting to join a Thread network.

The router device may be required to keep its transceiver enabled at all times, at least in some instances. Further, there are two types of routers devices defined by the Thread protocol—a leader router and a border router. A leader router may be responsible for managing a set of router devices (routers) and may be dynamically self-elected for fault tolerance. A leader router may aggregate and distribute network wide configuration information. A border router may be a router device that can forward information between the Thread network and a non-Thread network (e.g., such as a Wi-Fi network, Bluetooth network, and/or other types of networks).

The end device may primarily communicate with a single router device and may not forward packets to and/or for other network devices (e.g., other router devices and/or other end devices). The end device may not be required to keep its transceiver enabled at all times, at least in some instances. Further, there may be four types (or categories) of end devices—a minimal end device, a sleepy end device, a full end device, and a router eligible end device. A minimal end device (MED) may be required to always have its transceiver on and may not be required to poll for messages from its parent (e.g., parent router device). A sleepy end device (SED) may be normally disabled (e.g., transceiver off) and may wake on occasion to poll for messages from its parent. A full end device (FED) may be required to always have its transceiver on but cannot be promoted to a router device whereas a router eligible end device (REED) may be required to always have its transceiver on and may be eligible to be promoted to a router device.

Figure 5:
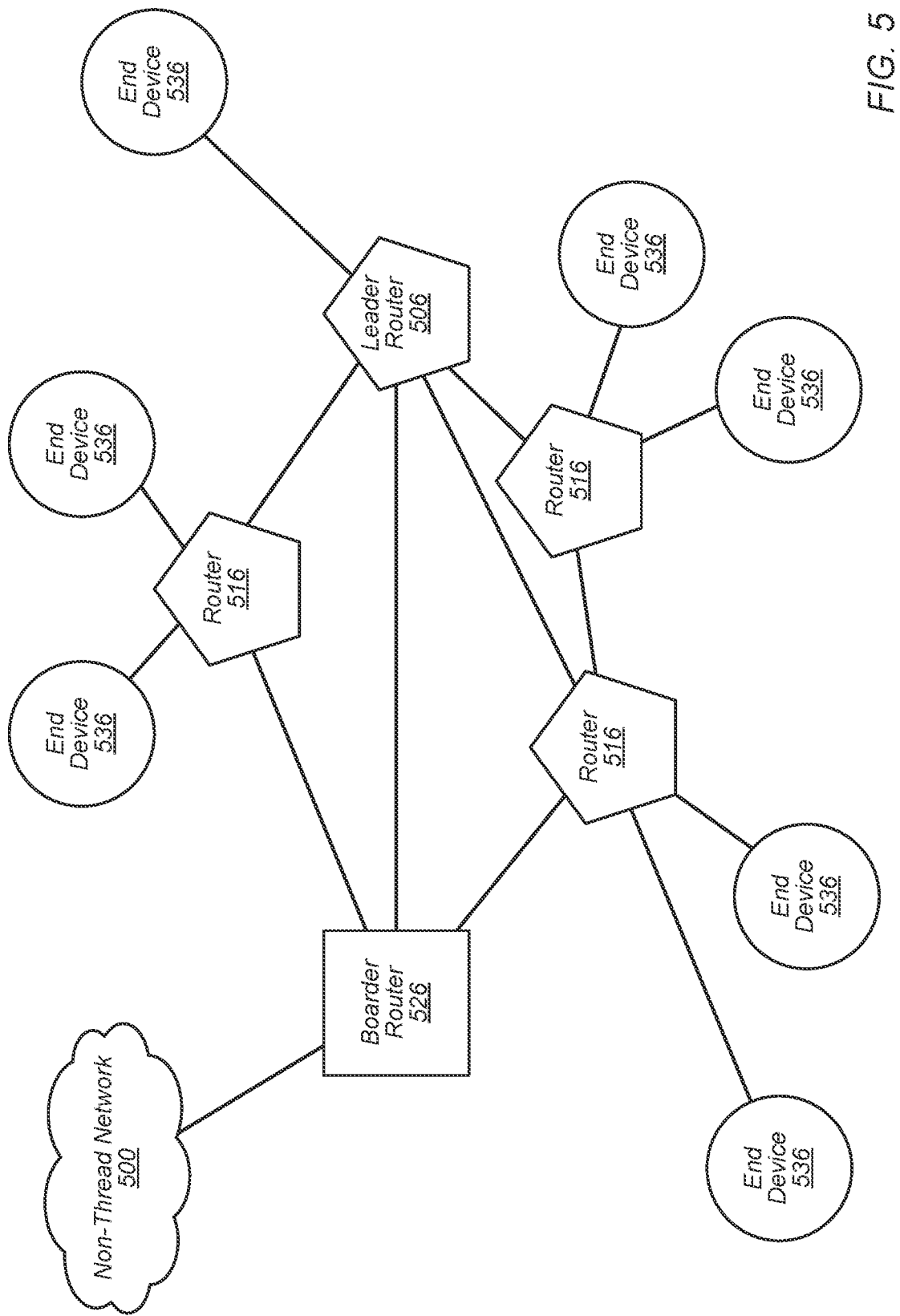
FIG. 5 illustrates an example of a Thread network with leader routers and border routers, according to some embodiments.

FIG. 5 illustrates an example of a Thread network with leader routers and border routers, according to some embodiments. As shown, leader router 506 may connect to other routers 516 as well as border router 526 and end devices 536. Boarder router 526 may also connect to other routers 516 as well as a non-Thread network 500. Further, in some embodiments, as further described below, any of the Thread devices exemplified by FIG. 5 may be configured to perform methods to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

Optimized Eco-System Design with Thread Devices

Figure 6:
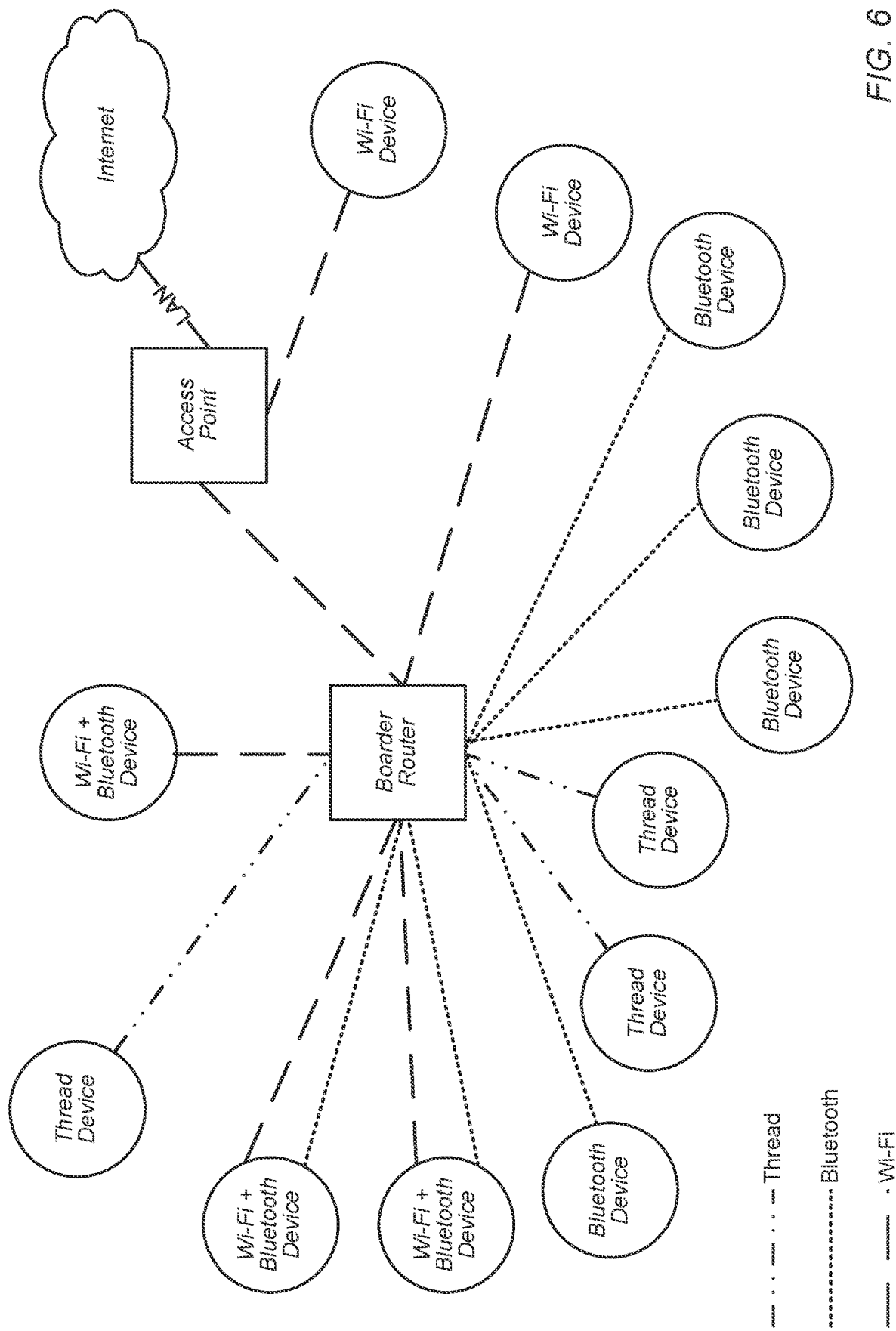
FIG. 6 illustrates an example of a Thread network.

In current implementations, border routers interconnect with a Thread network as well as support Wi-Fi and Bluetooth connections. Each connection may at times have demanding performance requirements. As illustrated by FIG. 6, a border router may be in simultaneous communication with multiple devices over Thread, Wi-Fi, and Bluetooth connections (e.g., using one or more Thread radios, Wi-Fi radios, and/or Bluetooth radios simultaneously). Wi-Fi connections may have challenging use cases such as 4K video streaming and low latency stereo audio (e.g., home theater). Additionally, Bluetooth connections may also have demanding use cases such as multiple Bluetooth game controllers with 7.5 ms, 10 ms, and/or 15 ms sniff intervals as well as supporting spatial audio. Further, Thread connections must also be supported by the border router in conjunction with the Wi-Fi and Bluetooth connections.

Further, in current implementations, a Thread mesh network is formed based on a highest calculated two-way link quality. For example, for a given parent device response, a link margin type-length-value (TLV) and a received signal strength indicator (RSSI) of the parent device response can be used to calculate a link quality in each direction. The minimum of an incoming link quality and an outgoing link quality is the two-way link quality. Thus, meshes are formed based solely on two-way link quality which may lead to a boarder device becoming overburdened. In other words, end devices and/or other router devices may gravitate towards connections with the boarder device based solely on two-way link quality without consideration for other connections being supported by the boarder device (e.g., such as a number of Thread connections, Wi-Fi connections, and/or Bluetooth connections).

Additionally, in smaller form factor wireless devices, there may be limited antenna isolation between Wi-Fi radios and Thread radios, thus Wi-Fi radios and Thread radios may operate in a time division duplexing (TDD) mode. However, in current implementations, Wi-Fi radios may send out a protected management (PM) frame or a clear-to-send (CTS) protection frame or grant without condition (e.g., without considering the Thread radio state). For a Thread radio transmission case, this scenario works well as Wi-Fi radio transmissions and Thread radio transmissions are coordinated. However, for a Thread radio receive scenario, by the time a Thread packet preamble is detected, a Wi-Fi radio transmission may already have been sent and the Wi-Fi radio transmission may corrupt the Thread packets and cause a high Thread packet error rate (PER).

Embodiments described herein provide systems, methods, and mechanisms to enhance border router performance across Thread, Wi-Fi, and Bluetooth protocols, including mechanisms for Thread network mesh reconfiguration for optimized/enhanced coexistence and frequency selection with Wi-Fi and Bluetooth, co-located Wi-Fi/Bluetooth/Thread coexistence border router design, and dynamic adjustment for Thread energy detection (ED).

For example, an additional field may be added to a vendor TLV that provides an indication of a confidence in a quality of a connection (e.g., a confidence factor). The additional field may take into account how many devices (e.g., how many Thread devices, Wi-Fi devices, Bluetooth devices, and so forth) are connected to a Thread device as well as bandwidth key performance indicators (KPIS) and latency KPIS for the devices connected to the Thread device. Further, the additional field (e.g., the confidence factor) may take into account dynamic Wi-Fi link quality measurements (LQMs) and dynamic Bluetooth LQMs. The value of the additional field may be an integer with a range of −5 to 0. Additionally, the value may map to 0 to 10 in the vendor TLV. FIG. 7 illustrates an example vendor TLV, according to some embodiments. As shown, the vendor TLV may include 16 bits for a vendor identifier (ID) and 16 bits for vendor data. The vendor data may be configured with bits 4-7 indicating the additional field, e.g., the confidence factor.

Figure 8:
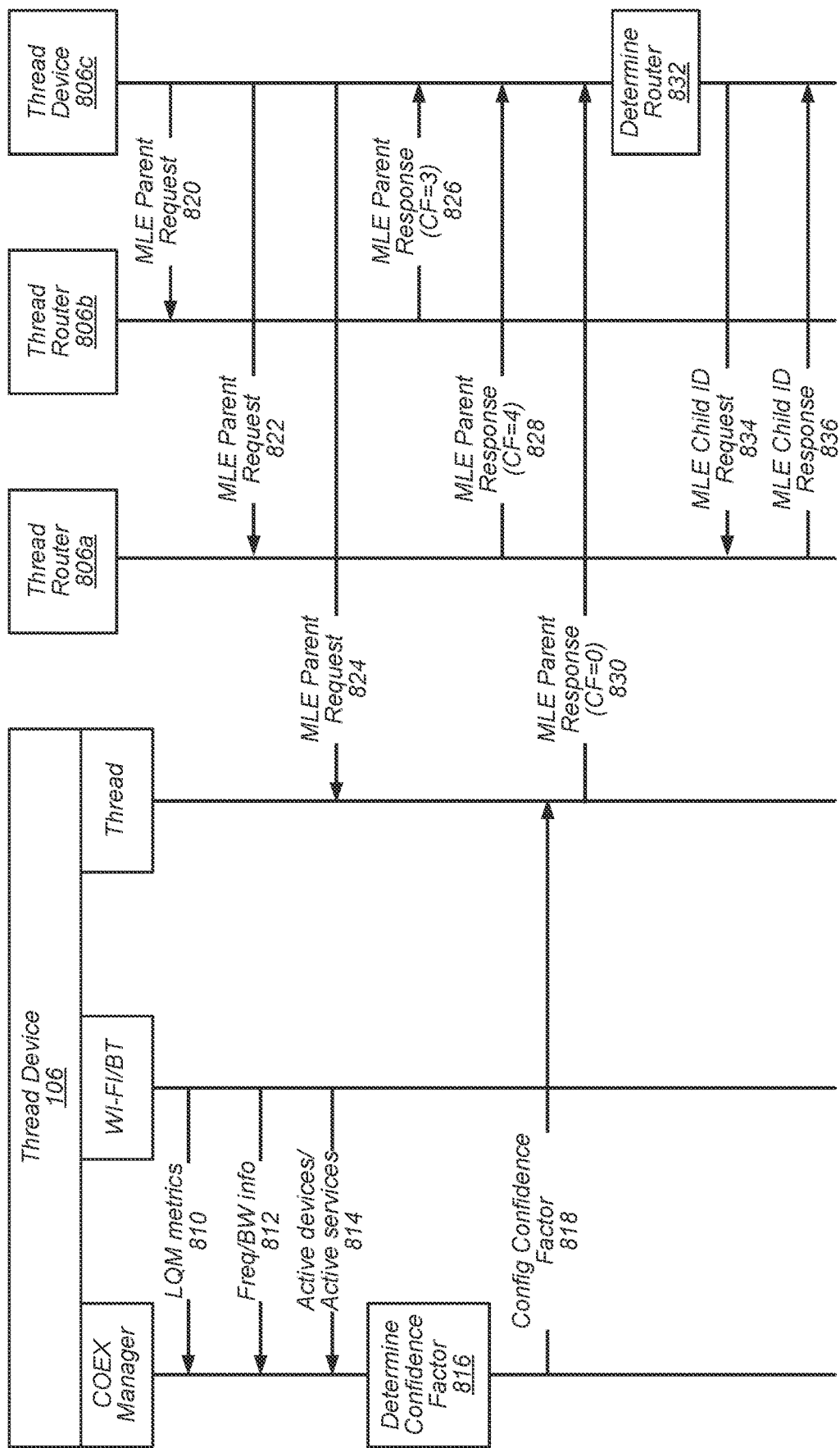
FIG. 8 illustrates an example of signaling for Thread mesh network establishment, according to some embodiments.

FIG. 8 illustrates an example of signaling for Thread mesh network establishment, according to some embodiments. The signaling shown in FIG. 8 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 810, Wi-Fi and Bluetooth modules (e.g., radios) of a Thread device 106, which may be a wireless station 106, may send LQM metrics to a coexistence manager of Thread device 106. Additionally, at 812, the Wi-Fi and Bluetooth modules may send frequency and bandwidth information to the coexistence manager. In addition, at 814, the Wi-Fi and Bluetooth modules may send information regarding a number of active devices and a number of active services on Wi-Fi and Bluetooth (e.g., such as transmission and/or reception requirements). Then, at 816, the coexistence manager may use the received data to determine and/or evaluate a confidence factor for Thread connections. For example, as Wi-Fi and/or Bluetooth demand for the Thread device 106's support increases, the confidence factor may decrease and as Wi-Fi and/or Bluetooth demand for the Thread device 106's support decreases, the confidence factor may increase. At 818, the coexistence manager may send the confidence factor to a Thread module (e.g., radio) of the Thread device 106.

In addition, a Thread device 806c (e.g., which may be a Thread router and/or Thread end device) may be attempting to create a Thread mesh connection with a Thread router. Thus, Thread device 806c may send mesh link establishment (MLE) parent requests 820, 822, and 824 to Thread router 806b, Thread router 806a, and Thread device 106. Each of the Thread routers 806a and 806b as well as Thread device 106 may respond with an MLE parent response that includes a vendor TLV as described above in reference to FIG. 7. Thus, the vendor TLV may include a confidence factor. As shown, MLE parent response 826 from Thread router 806b may include a confidence factor with a value of 3 and MLE parent response 828 from Thread router 806a may include a confidence factor with a value of 4. Additionally, Thread device 106 may include a confidence factor with a value of 0 in its MLE parent response 830. Then, at 832, Thread device 806c may determine which Thread router to connect to, e.g., based at least in part, on the provided confidence factors. Thus, Thread device 806c may determine to connect to Thread router 806a and, at 834, send an MLE child identifier (ID) request to Thread router 806a. At 836, Thread router 806a may send an MLE child ID response to Thread device 806c.

Note that in current implementations, when a Thread device sends MLE parent requests, the device is required to wait for 750 ms for an MLE parent response. Then, if the Thread device does not receive an MLE parent response, the Thread device will re-attempt transmission of MLE parent requests, including router eligible end devices. Thus, in some embodiments, a Thread device, such as Thread device 106, may not respond to an initial MLE parent request from another Thread device, e.g., when the Thread device 106 determines that it may become overburdened with connections between Wi-Fi, Bluetooth, and Thread if further connections are added. Further, if the Thread device 106 receives another MLE parent request, meaning no other Thread routers are eligible to serve the Thread device, the Thread device 106 may then respond to the MLE parent request.

Figure 9:
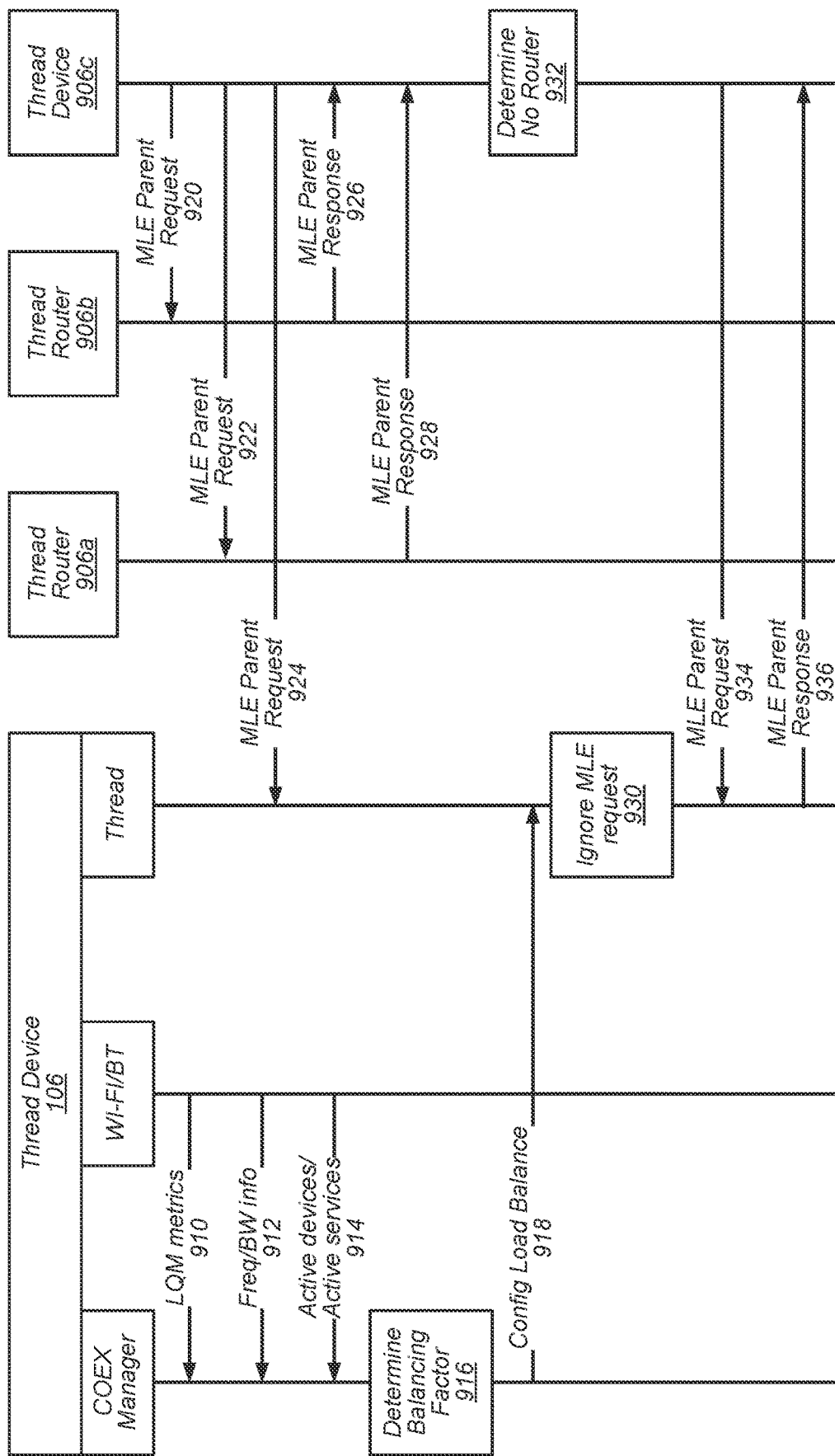
FIG. 9 illustrates another example of signaling for Thread mesh network establishment, according to some embodiments.

For example, FIG. 9 illustrates another example of signaling for Thread mesh network establishment, according to some embodiments. The signaling shown in FIG. 9 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 910, Wi-Fi and Bluetooth modules (e.g., radios) of a Thread device 106, which may be a wireless station 106, may send LQM metrics to a coexistence manager of Thread device 106. Additionally, at 912, the Wi-Fi and Bluetooth modules may send frequency and bandwidth information to the coexistence manager. In addition, at 914, the Wi-Fi and Bluetooth modules may send information regarding a number of active devices and a number active services on Wi-Fi and Bluetooth (e.g., such as transmission and/or reception requirements). Then, at 916, the coexistence manager may use the received data to determine and/or evaluate whether load balancing for Thread connections is required. At 918, the coexistence manager may send a load balance configuration to a Thread module of the Thread device 106. The load balance configuration may indicate that the Thread module should not respond to initial MLE parent requests from neighboring Thread devices.

In addition, a Thread device 906c (e.g., which may be a Thread router and/or Thread end device) may be attempting to create a Thread mesh connection with a Thread router. Thus, Thread device 906c may send MLE parent requests 920, 922, and 924 to Thread router 906*b*, Thread router 906*a*, and Thread device 106. Each of the Thread routers 906*a* and 906*b* may respond with an MLE parent response 928 and 926, respectively, however, based on the load balancing configuration. Thread device 106 may ignore the MLE request at 930. Note that the MLE parent responses 926 and 928 may each include a vendor TLV as described above in reference to FIG. 7. Thus, the vendor TLV may include a confidence factor. Then, at 932, Thread device 906*c* may determine that no responding Thread router is eligible/available for connection. Thus, Thread device 906*c* may determine to reattempt connection, e.g., after waiting the delay period and transmit MLE parent request 934 to Thread device 106. Thread device 106 may then respond with MLE parent response 936, thereby initiating a Thread connection with Thread device 906*c*.

In some embodiments, when a Thread device, such as Thread device 106, determines that it may become overburdened with connections between Wi-Fi, Bluetooth, and Thread if further connections are added, the Thread device may modify a link margin TLV such that a link quality for the Thread device will appear as a lowest possible good value (e.g., such as greater than 2 decibels). Thus, a Thread device receiving such a value may decide to connect to another Thread router that has a higher link quality. Further, if there are no Thread routers with a higher link quality, then at attempt can be made to connect to Thread device 106.

Figure 10:
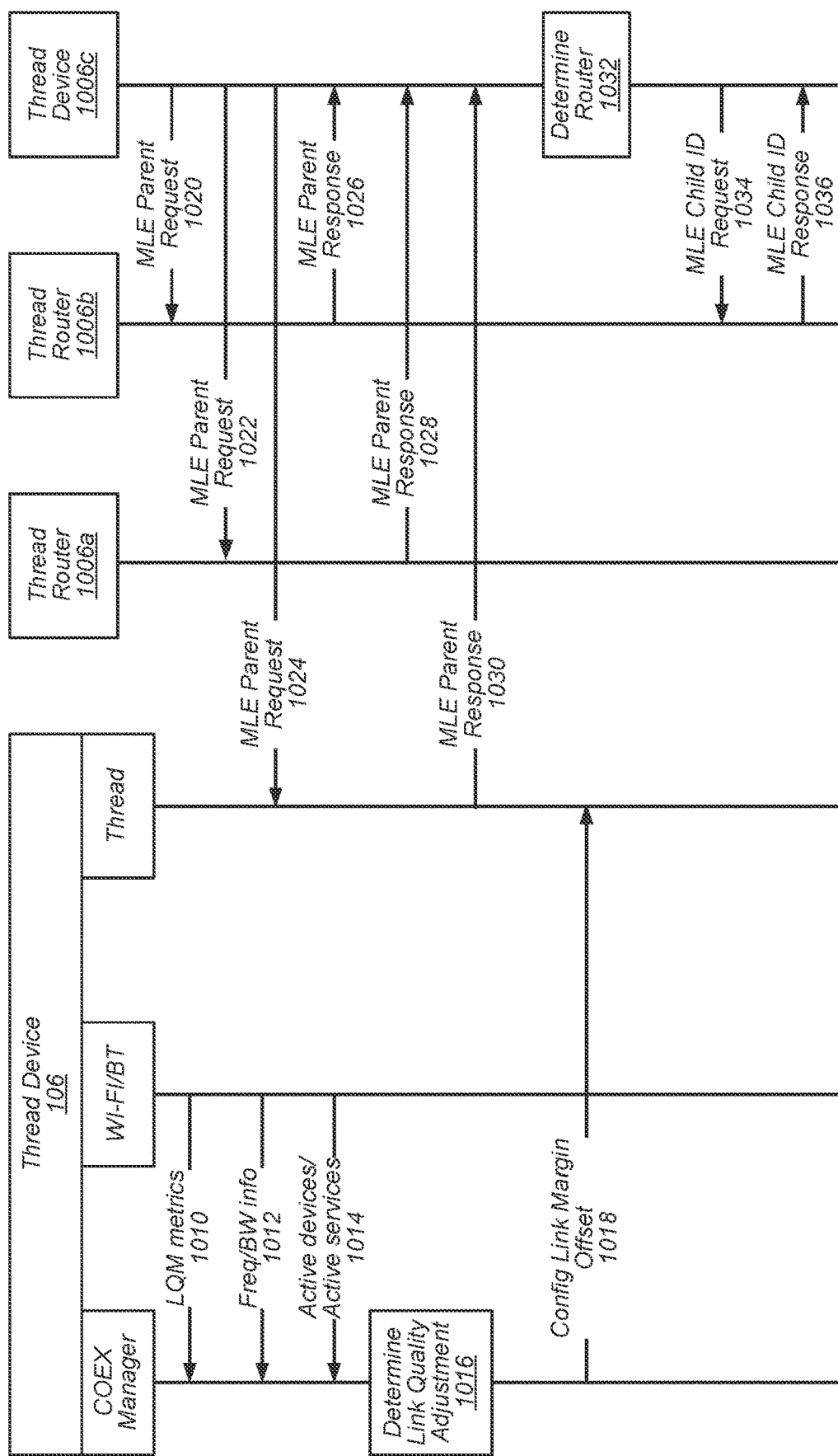
FIG. 10 illustrates a further example of signaling for Thread mesh network establishment, according to some embodiments.

For example, FIG. 10 illustrates a further example of signaling for Thread mesh network establishment, according to some embodiments. The signaling shown in FIG. 10 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1010, Wi-Fi and Bluetooth modules (e.g., radios) of a Thread device 106, which may be a wireless station 106, may send LQM metrics to a coexistence manager of Thread device 106. Additionally, at 1012, the Wi-Fi and Bluetooth modules may send frequency and bandwidth information to the coexistence manager. In addition, at 1014, the Wi-Fi and Bluetooth modules may send information regarding a number of active devices and a number of active services on Wi-Fi and Bluetooth (e.g., such as transmission and/or reception requirements). Then, at 1016, the coexistence manager may use the received data to determine and/or evaluate whether load balancing for Thread connections is required and whether to make a link quality adjustment to deter Thread connections. At 1018, the coexistence manager may send a link margin offset configuration to a Thread module of the Thread device 106. The link margin offset configuration may indicate that the Thread module should deter Thread connections and adjust a link quality included in MLE parent responses accordingly.

In addition, a Thread device 1006*c* (e.g., which may be a Thread router and/or Thread end device) may be attempting to create a Thread mesh connection with a Thread router. Thus, Thread device 1006*c* may send MLE parent requests 1020, 1022, and 1024 to Thread router 1006*b*, Thread router 1006*a*, and Thread device 106. Each of the Thread routers 1006*a* and 1006*b* and Thread device 106 may respond with an MLE parent response 1028, 1026, and 1030. Thread routers 1006*a* and 1006*b* may include their actual link quality, however, based on the link margin offset configuration, Thread device 106 may adjust its link quality in MLE response 1030. Then, at 1032, Thread device 1006*c* may determine a Thread router based on link qualities reported in the MLE responses 1026, 1028, and 1030. For example, Thread router 1006*a* may report a link margin of greater than 10 decibels, Thread router 1006*b* may report a link margin of greater than 20 decibels, and Thread device 106 may report a modified (e.g., adjusted) link margin of greater than 2 decibels. Thus, Thread device 1006*c* may select Thread router 1006*b* for connection, e.g., based on the link quality and transmit MLE child ID request 1034 to Thread router 1006*b* and receive MLE child ID response 1036 from Thread router 1006*b* to establish a Thread connection.

In some embodiments, to improve coexistence between a Wi-Fi radio and a Thread radio, a wireless device, such as wireless device 106, may suppress a Wi-Fi PM frame to be transmitted by the Wi-Fi radio when a Thread reception is requested by the Thread radio. Thus, Wi-Fi transmissions may be silenced during a Thread reception period. In some instances, Thread reception traffic may be suppressed to avoid long durations of unresponsive time for the Wi-Fi radio without PM frame protection. Additionally, the Thread radio may not raise a reception request until the Thread radio confirms a packet is being transmitted to it. Further, Thread traffic is normally low duty cycle and typically occurs only sporadically over time (e.g., such as turning on/off lights, periodically requesting temperature, and so forth). In addition, for certain Wi-Fi critical usage cases such as Wi-Fi calibration, Wi-Fi low data rate, and/or low latency Wi-Fi applications, the wireless device (e.g., a coexistence manager of the wireless device and/or the Wi-Fi radio) may deny Thread reception requests and utilize Thread retry mechanisms (e.g., up to N times) to maintain Thread performance.

In some embodiments, in cases where there is heavy on-going Wi-Fi traffic, the Thread radio may have difficulty accessing the medium due to Thread's comparatively conservative clear channel assessment (CCA) design (e.g., putting Thread radio at a disadvantage as compared with the Wi-Fi radio's CCA design). Thus, the Wi-Fi radio may periodically transmit a clear-to-send-to-self (CTS2S) frame to allow the Thread radio an opportunity to access the medium and ensure maintenance of a Thread link, e.g., as illustrated by FIG. 11. Such opportunities may be considered unsolicited grant periods for the Thread radio to access the medium.

In some embodiments, to improve coexistence between a Bluetooth radio and a Thread radio of a wireless device, such as wireless device 106, (e.g., especially in cases where there is heavy on-going Bluetooth traffic), Bluetooth radio transmission/receptions and Thread radio transmission/receptions may be time division duplexed (TTD) such that Thread packets may be aligned with Bluetooth idle time. Further, a small portion of Bluetooth traffic may be periodically suppressed to generate unsolicited grant periods for the Thread radio to access the medium, e.g., as illustrated by FIG. 12.

Figure 13:
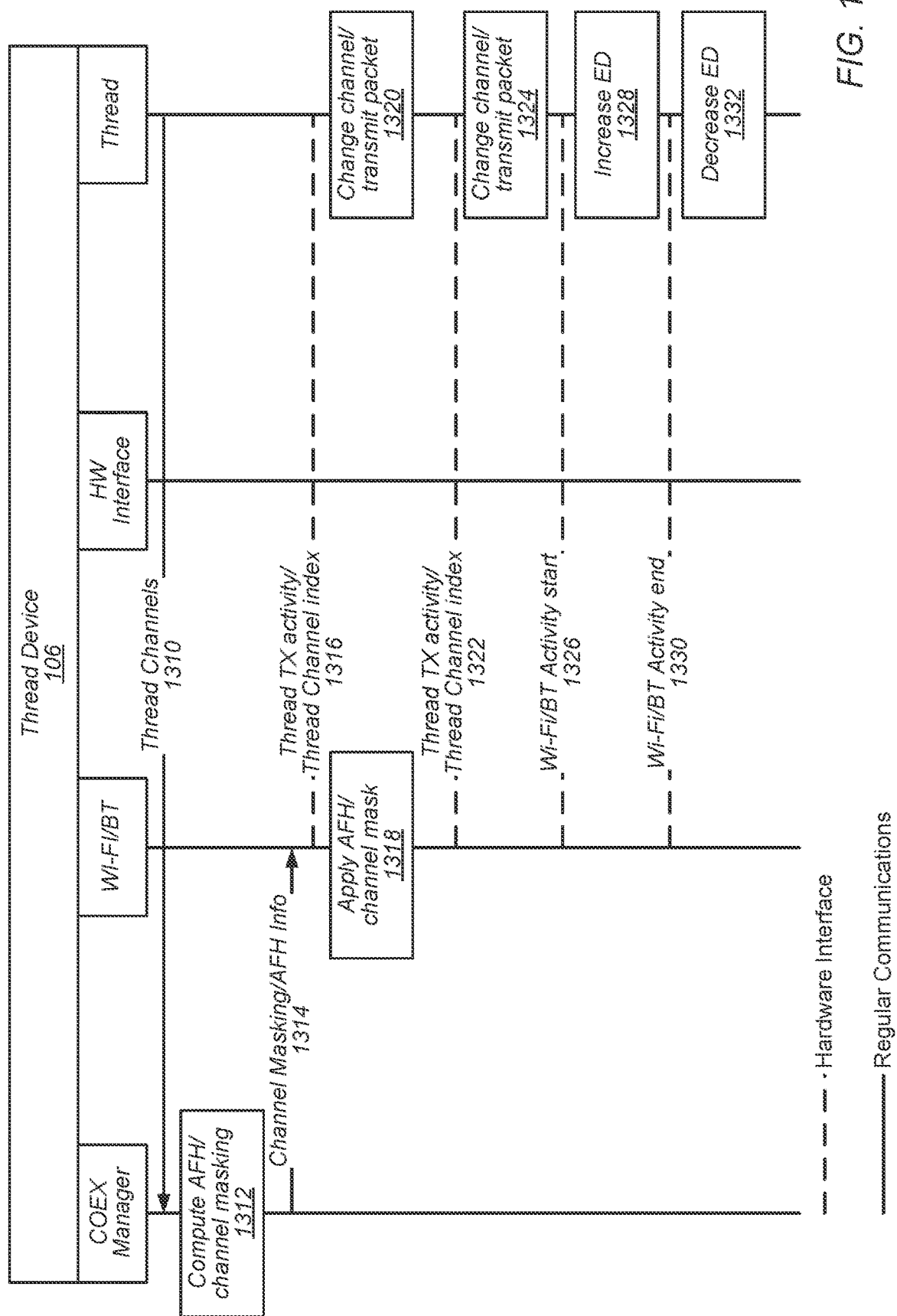
FIG. 13 illustrates an example of adaptive energy detection for Thread mesh network communications, according to some embodiments.

However, since coexistence needs to be maintained across Wi-Fi, Bluetooth, and Thread radios, each radio may need to control and/or access coexistence logic when other radios are off (sleeping). Thus, in some embodiments, a hybrid active frequency hopping (AFH) map may be implemented along with adaptive energy detection thresholds when there is noise generated at a Thread radio. For example, FIG. 13 illustrates an example of adaptive energy detection for Thread mesh network communications, according to some embodiments. The signaling shown in FIG. 13 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1310, a Thread radio (e.g., module) of a Thread device, such as Thread device 106, may report Thread channels to a coexistence manager of Thread device 106, which may be a wireless device 106. At 1312, the coexistence manager may compute AFH and channel masking for the Thread channels and report the AFH and channel masking to a Wi-Fi radio and/or Bluetooth radio of Thread device 106 at 1314. At 1316, the Thread radio may communicate Thread transmit activity and/or Thread channel index via a hardware interface with the Wi-Fi radio and/or Bluetooth radio. At 1318, the AFH and channel mask may be applied by the Wi-Fi radio and/or Bluetooth radio. At 1320, the Thread radio may perform packet transmission and/or change Thread channels. At 1322, the Thread radio may communicate Thread transmit activity and/or Thread channel index via the hardware interface with the Wi-Fi radio and/or Bluetooth radio. At 1324, the Thread radio may perform packet transmission and/or change Thread channels. At 1326, one of the Wi-Fi radio and/or Bluetooth radio may notify the Thread radio of a start of activity (e.g., transmission and/or reception via the Wi-Fi radio and/or Bluetooth radio) via the hardware interface. At 1328, the Thread radio may increase an energy detection threshold, thereby increasing a likelihood that the Thread radio determines the medium is busy and/or congested. At 1330, the Thread radio may be notified of an end of activity (e.g., transmission and/or reception via the Wi-Fi radio and/or Bluetooth radio) via the hardware interface. In response, at 1332, the Thread radio may decrease the energy detection threshold, thereby decreasing a likelihood that the Thread radio determines the medium is busy and/or congested.

Figure 16:
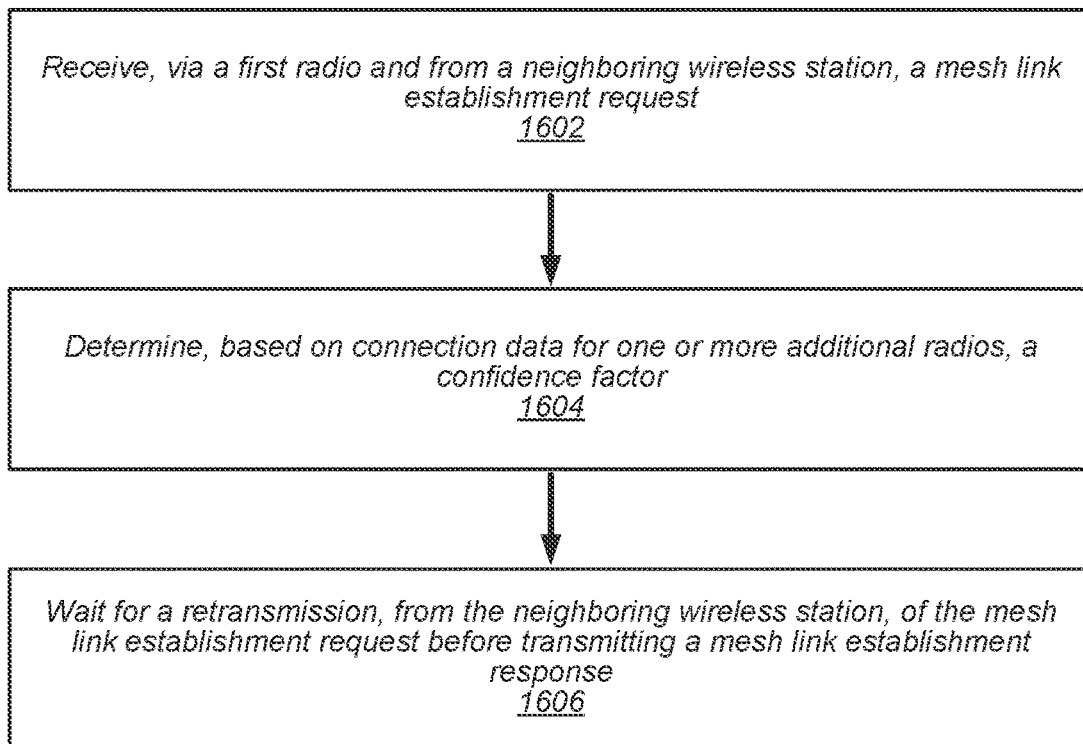
Figure 17:
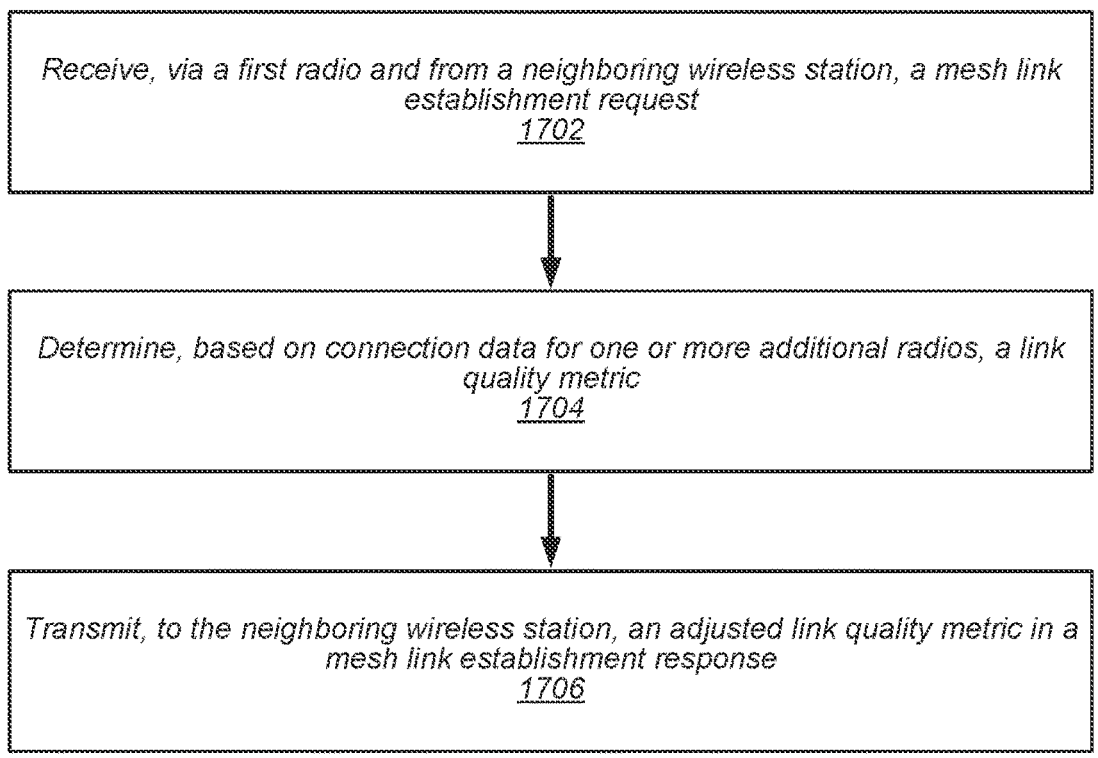
Figure 18:
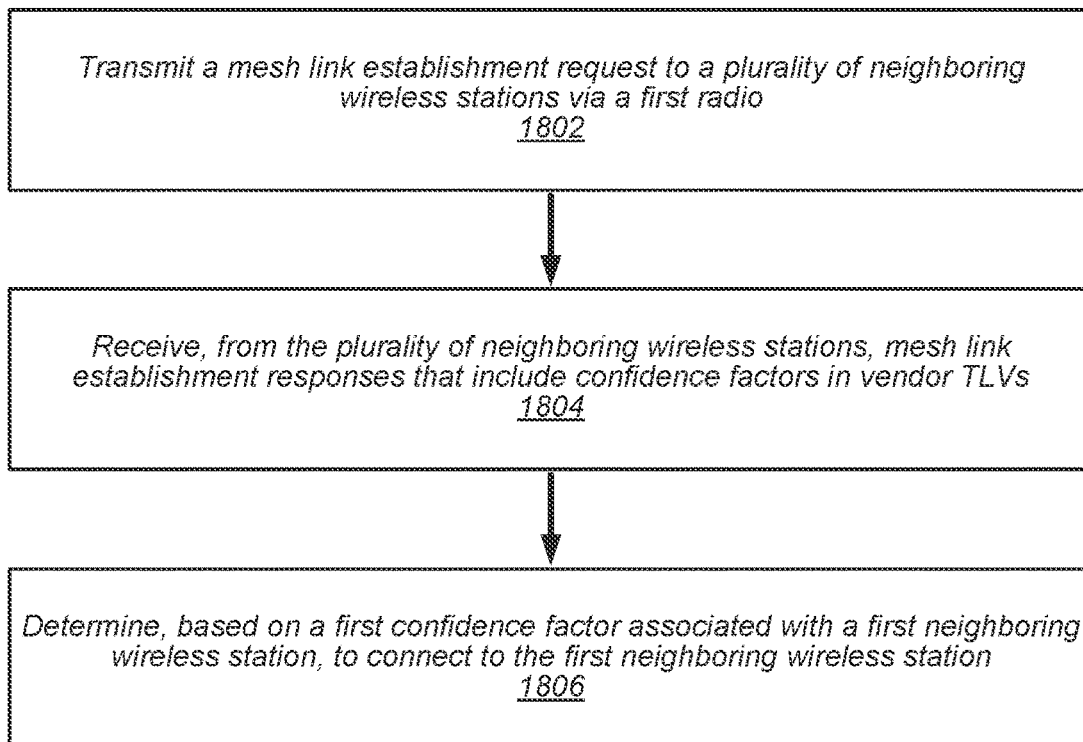
Figure 19:
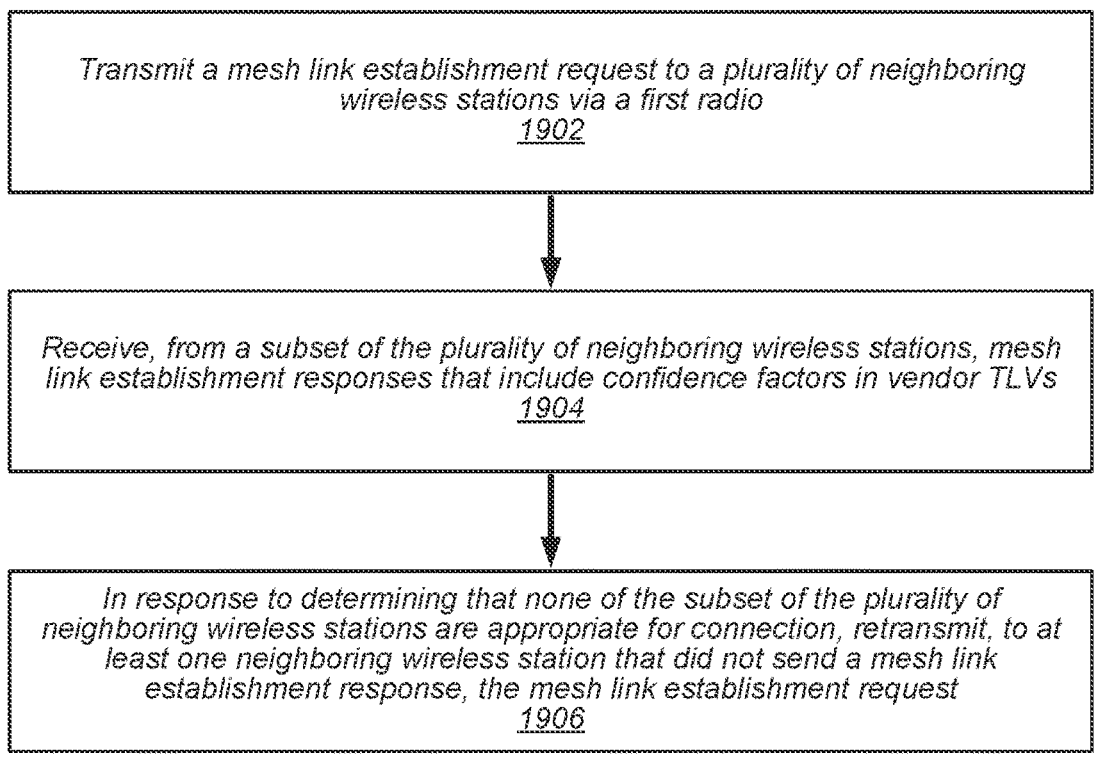

FIGS. 14-19 illustrate block diagrams of examples of methods for mesh link establishment in a mesh network, according to some embodiments. Note that FIGS. 14-17 illustrate block diagrams of examples of methods for mesh link establishment from the perspective of a router, e.g., such as a Thread router. Note further that FIGS. 18-19 illustrate block diagrams of examples of methods for mesh link establishment from the perspective of an end device or router, e.g., such as a Thread end device or thread router. The methods shown in FIGS. 14-19 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Figure 14:
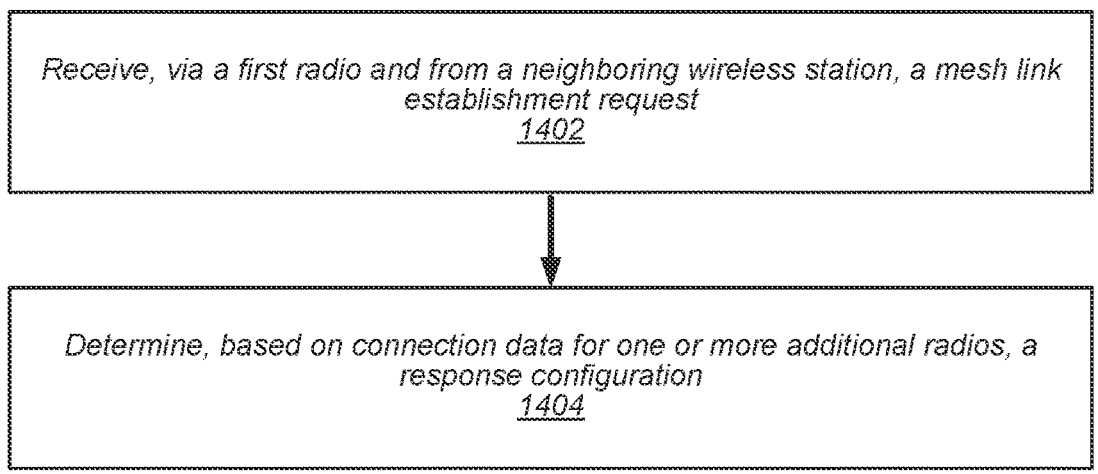
FIGS. 14-19 illustrate block diagrams of examples of methods for mesh link establishment in a mesh network, according to some embodiments.

Turning to FIG. 14, at 1402, a wireless station, such as wireless station 106 and/or access point 112, may receive a mesh link establishment request from a neighboring wireless station, which may also be a wireless station 106 and/or an access point 112. The mesh link establishment request may be received via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router. Note further that the neighboring wireless station may be configured as a Thread router and/or a Thread end device.

At 1404, the wireless station may determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, the wireless station may establish a mesh link connection with the neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on the at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

Figure 15:
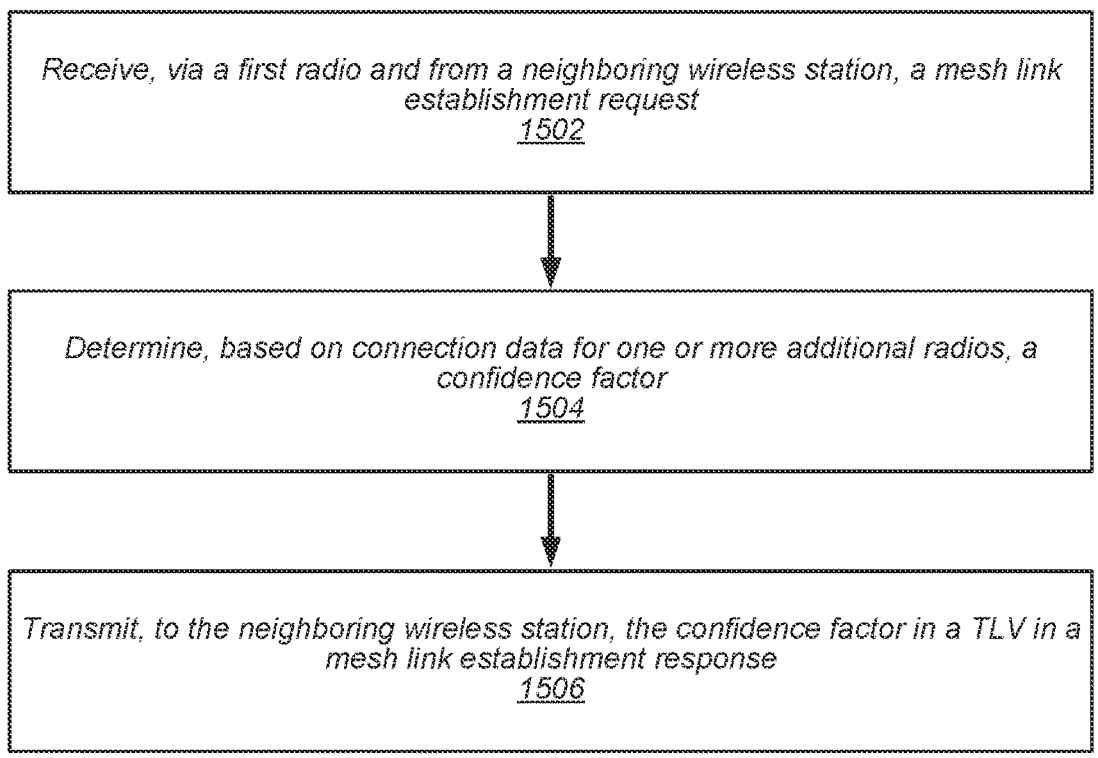

Turning to FIG. 15, at 1502, a wireless station, such as wireless station 106 and/or access point 112, may receive a mesh link establishment request from a neighboring wireless station, which may also be a wireless station 106 and/or an access point 112. The mesh link establishment request may be received via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router. Note further that the neighboring wireless station may be configured as a Thread router and/or a Thread end device.

At 1504, the wireless station may determine, based, at least in part, on connection data for the one or more additional radios, a confidence factor. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

At 1506, the wireless station may transmit a mesh link establishment response that includes a confidence factor in a vendor TLV to the neighboring wireless station.

In some instances, the wireless station may establish a mesh link connection with the neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

Turning to FIG. 16, at 1602, a wireless station, such as wireless station 106 and/or access point 112, may receive a mesh link establishment request from a neighboring wireless station, which may also be a wireless station 106 and/or an access point 112. The mesh link establishment request may be received via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router. Note further that the neighboring wireless station may be configured as a Thread router and/or a Thread end device.

At 1604, the wireless station may determine, based, at least in part, on connection data for the one or more additional radios, a confidence factor. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

At 1606, the wireless station may wait for a retransmission of the mesh link establishment request before transmitting a mesh link establishment response to the neighboring wireless station. In some instances, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, the wireless station may establish a mesh link connection with the neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

Turning to FIG. 17, at 1702, a wireless station, such as wireless station 106 and/or access point 112, may receive a mesh link establishment request from a neighboring wireless station, which may also be a wireless station 106 and/or an access point 112. The mesh link establishment request may be received via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router. Note further that the neighboring wireless station may be configured as a Thread router and/or a Thread end device.

At 1704, the wireless station may determine, based, at least in part, on connection data for the one or more additional radios, a link quality metric. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. In some instances, the wireless station may determine, based, at least in part, on the connection data, to deter establishment of mesh links and adjust a link quality metric, e.g., such as by using a link margin offset to generate the adjusted link quality metric.

At 1706, the wireless station may transmit an adjusted link quality metric in a mesh link establishment response to the neighboring wireless station.

In some instances, the wireless station may establish a mesh link connection with the neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

Turning to FIG. 18, at 1802, a wireless station, such as wireless station 106 and/or access point 112, may transmit mesh link establishment requests to a plurality of neighboring wireless stations, which may also be a wireless station 106 and/or an access point 112. The mesh link establishment requests may be transmitted via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or a Thread end device. Note further that the plurality of neighboring wireless stations may be configured as Thread routers.

At 1804, the wireless station may receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor.

At 1806, the wireless station may determine, based, at least in part, on a first confidence factor associated with a first neighboring wireless station of the plurality of wireless neighboring wireless stations, to connect to the first neighboring wireless station. In some instances, the first confidence factor may be based, at least in part, on connection data of the first neighboring wireless station. The connection data may include information associated with the first RAT and information associated with the one or more additional RATs. Further, the connection data may include connection data for one or more radios of the first neighboring wireless station and the connection data for the one or more radios may include any, any combination of, and/or all of (e.g., at least one of and/or one or more of) a number of active services or a number of active connections of the first neighboring wireless station. In some instances, the connection data may include any, any combination of, and/or all of (e.g., at least one of and/or one or more of) a number of devices connected to the first neighboring wireless station, bandwidth key performance indicators (KPIS) for devices connected to the first neighboring wireless station, latency KPIS for the devices connected to the first neighboring wireless station, dynamic Wi-Fi link quality measurements (LQMs), and/or dynamic Bluetooth LQMs. In some instances, connections to the devices connected to the first neighboring wireless station may include any, any combination of, and/or all of (e.g., at least one of and/or one or more of) a Thread connection, a Wi-Fi connection, and/or a Bluetooth connection.

In some instances, the wireless station may transmit, to the first neighboring wireless station, a mesh link child identifier request and receive, from the first neighboring wireless station, a mesh link child identifier response. Note that by transmitting, to the first neighboring wireless station, the mesh link child identifier, the wireless station may initiate a mesh link connection with the first neighboring wireless station.

In some instances, the wireless station may establish a mesh link connection with the first neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the first neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the first neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the first neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the first neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the first neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the first neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

Turning to FIG. 19, at 1902, a wireless station, such as wireless station 106 and/or access point 112, may transmit mesh link establishment requests to a plurality of neighboring wireless stations, which may also be a wireless station 106 and/or an access point 112. The mesh link establishment requests may be transmitted via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or a Thread end device. Note further that the plurality of neighboring wireless stations may be configured as Thread routers.

At 1904, the wireless station may receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections.

At 1906, the wireless station may, in response to determining that none of the subset of the plurality of neighboring wireless stations are appropriate for connection, retransmit, to at least one neighboring wireless station that did not send a mesh link establishment response, the mesh link establishment request. In some instances, the wireless station may wait a delay period prior to retransmitting the mesh link establishment request. The delay period may be pre-configured and/or specified. In some instances, the wireless station may receive, from the at least one neighboring wireless station, a mesh link establishment response. Note that the mesh link establishment response may initiate a mesh connection between the wireless station and the at least one neighboring wireless station.

In some instances, the wireless station may establish a mesh link connection with the first neighboring wireless station and determine that a protected management frame, to be transmitted by a second radio of the one or more radios, overlaps (e.g., interferes) with a requested reception of data by the first radio via the mesh link connection. Further, the wireless station may suppress transmission of the protected management frame by the second radio during a reception period of the data by the first radio.

In some instances, the wireless station may establish a mesh link connection with the first neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection for a period of time. The period of time may be pre-configured and/or specified.

In some instances, the wireless station may establish a mesh link connection with the first neighboring wireless station and determine that a duration of time between transmission of protected management frames by a second radio of the one or more radios has exceeded a threshold. The threshold may be pre-configured and/or specified. Further, the wireless station may suppress (e.g., not protect, not allow, and/or cancel) reception of data by the first radio via the mesh link connection until the first radio confirms a data packet intended for the first radio is being transmitted. The threshold may be pre-configured and/or specified. In some instances, the wireless station may confirm the data packet intended for the first radio is being transmitted and suppress transmission of the protected management frame by the second radio during a reception period of the data by the first radio.

In some instances, the wireless station may establish a mesh link connection with the first neighboring wireless station and deny reception requests for the mesh link connection based, at least in part, on determining that a mode of operation of a second radio of the one or more radios is a critical mode of operation. Further, the wireless station may utilize a retry mechanism to maintain performance of the mesh link. In some instances, the critical mode of operation may include any, any combination of, and/or all of (e.g., at least one of and/or one or more of) Wi-Fi calibration, Wi-Fi low data rate, and/or Wi-Fi low latency. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, the wireless station may establish a mesh link connection with the first neighboring wireless station and determine that a second radio of the one or more radios has on-going traffic that interferes with the mesh link connection. Further, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, the wireless station may establish a mesh link connection with the first neighboring wireless station and determine that a second radio of the one or more radios has on-going traffic that interferes with the mesh link connection. Further, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, the wireless station may establish a mesh link connection with the first neighboring wireless station and compute active frequency hopping (AFH) and a channel masking for channels used by the first radio. Further, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

FIGS. 20-26 illustrate block diagrams of examples of methods for multi-radio coexistence in a mesh network, according to some embodiments. The methods shown in FIGS. 20-26 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Figure 20:
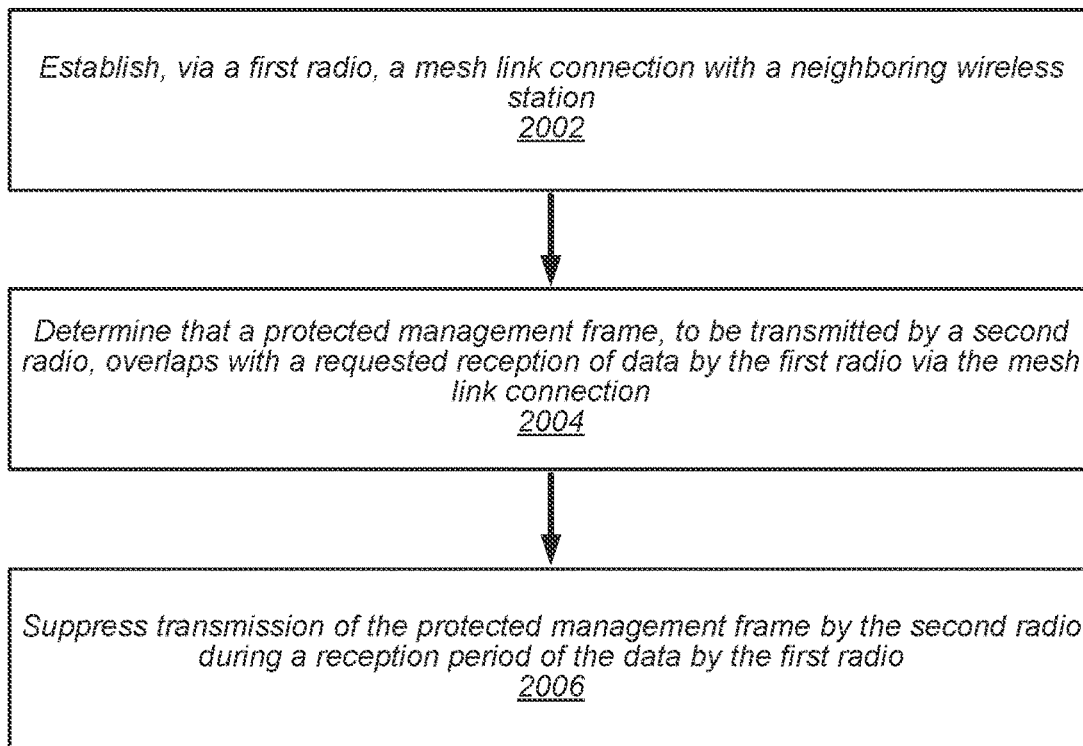
FIGS. 20-26 illustrate block diagrams of examples of methods for multi-radio coexistence in a mesh network, according to some embodiments.

Turning to FIG. 20, at 2002, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2004, the wireless station may determine that a protected management frame, to be transmitted by a second radio of the one or more radios, overlaps (e.g., interferes) with a requested reception of data by the first radio via the mesh link connection.

At 2006, the wireless station may suppress transmission of the protected management frame by the second radio during a reception period of the data by the first radio.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) a Thread connection, a Wi-Fi connection, and/or a Bluetooth connection. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 21:
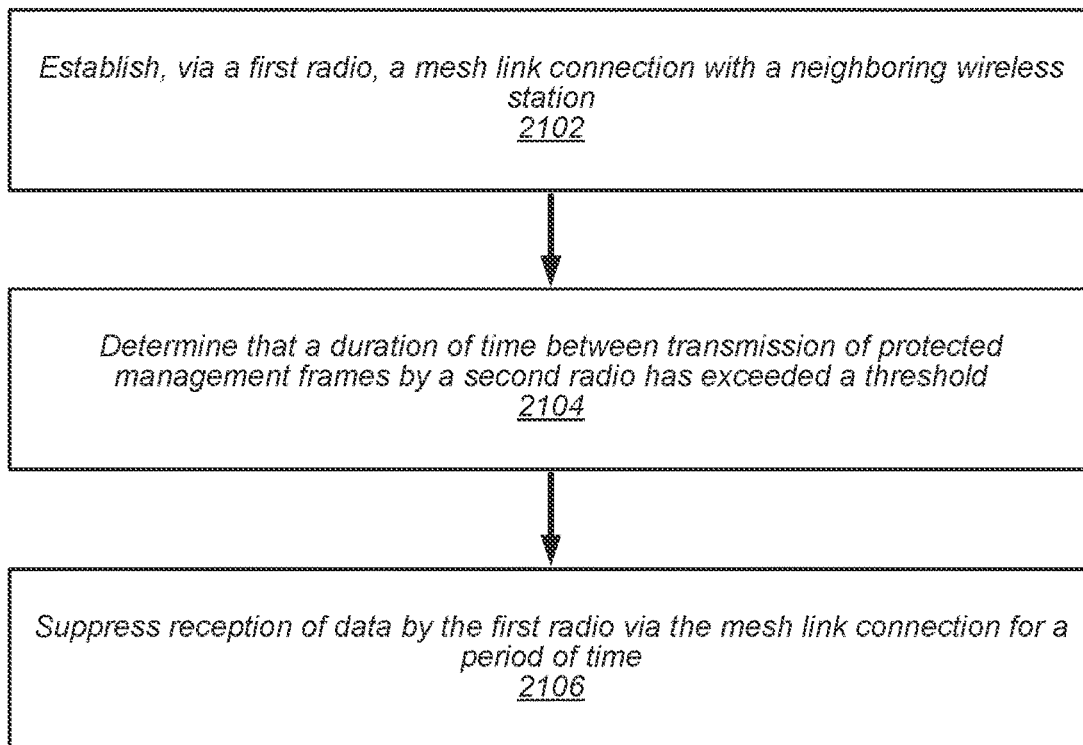

Turning to FIG. 21, at 2102, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2104, the wireless station may determine that a duration of time between transmission of protected management frames by a second radio of the one or more radios has exceeded a threshold. The threshold may be pre-configured and/or specified.

At 2106, the wireless station may suppress (e.g., not protect, not allow, and/or cancel) reception of data by the first radio via the mesh link connection for a period of time. The period of time may be pre-configured and/or specified.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) a Thread connection, a Wi-Fi connection, and/or a Bluetooth connection.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) a Thread connection, a Wi-Fi connection, and/or a Bluetooth connection. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 22:
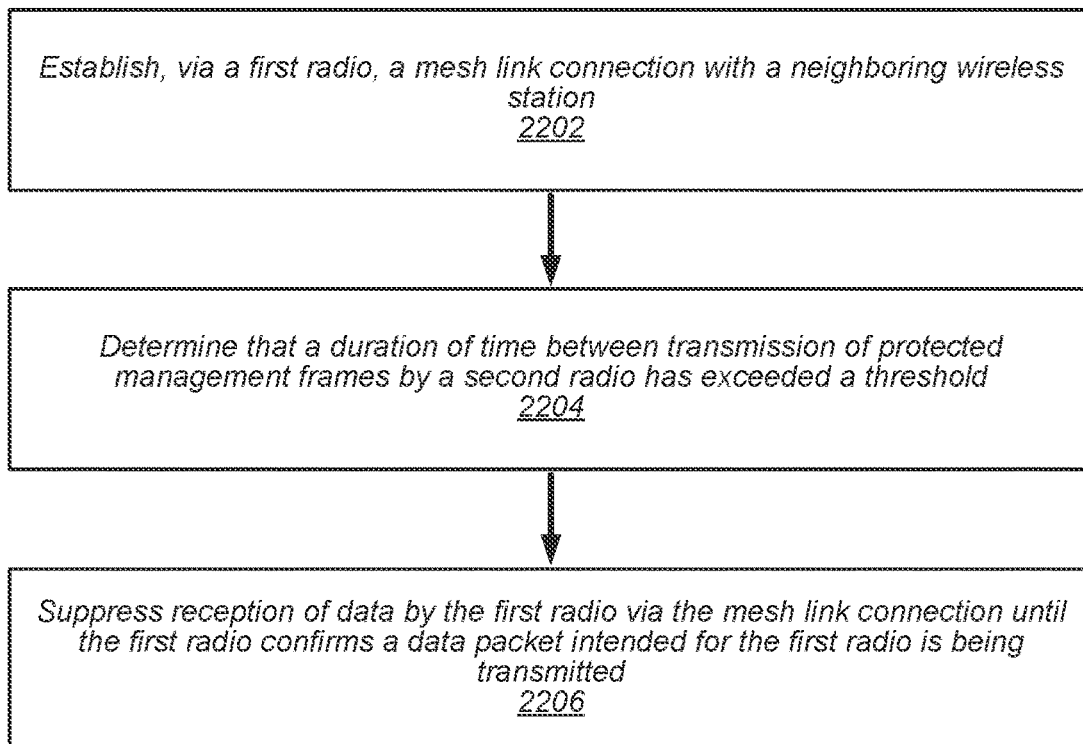

Turning to FIG. 22, at 2202, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2204, the wireless station may determine that a duration of time between transmission of protected management frames by a second radio of the one or more radios has exceeded a threshold. The threshold may be pre-configured and/or specified.

At 2206, the wireless station may suppress (e.g., not protect, not allow, and/or cancel) reception of data by the first radio via the mesh link connection until the first radio confirms a data packet intended for the first radio is being transmitted. In some instances, the wireless station may confirm the data packet intended for the first radio is being transmitted and suppress transmission of the protected management frame by the second radio during a reception period of the data by the first radio.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 23:
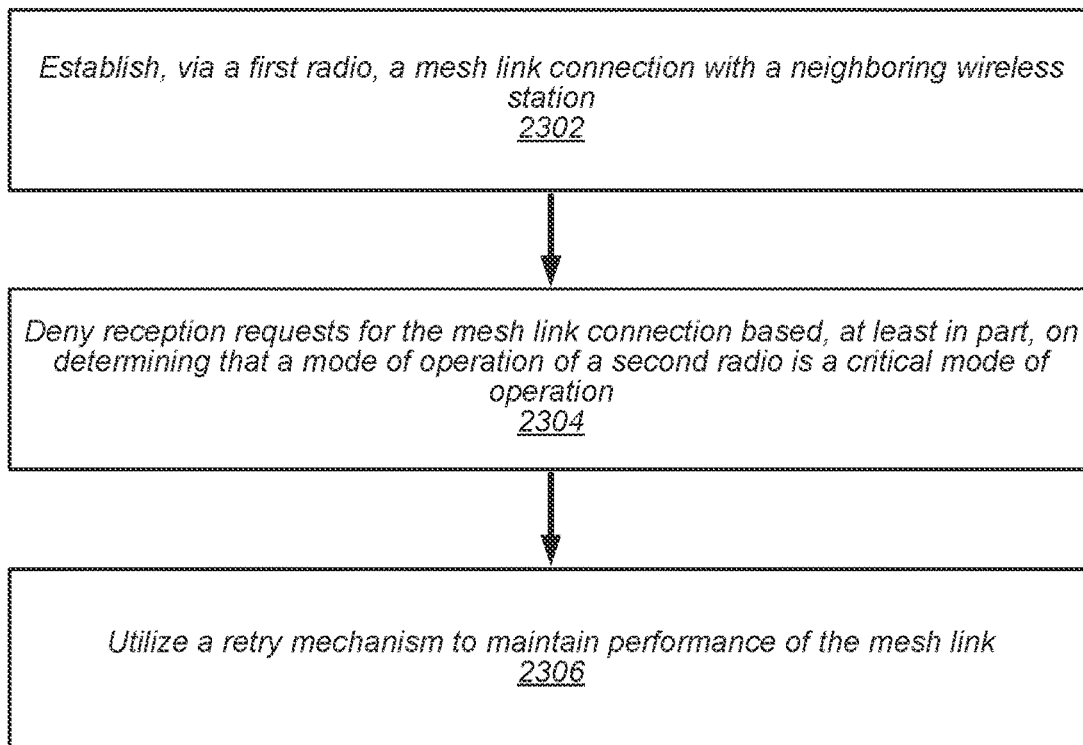

Turning to FIG. 23, at 2302, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2304, the wireless station may deny reception requests for the mesh link connection based, at least in part, on determining that a mode of operation of a second radio of the one or more radios is a critical mode of operation. In some instances, the critical mode of operation may include any, any combination of, and/or all of (e.g., at least one of and/or one or more of) Wi-Fi calibration, Wi-Fi low data rate, and/or Wi-Fi low latency.

At 2406, the wireless station may utilize a retry mechanism to maintain performance of the mesh link. In some instances, the retry mechanism may require a threshold number of reception requests for the wireless station to accept the reception request for the mesh link connection. The threshold may be pre-configured and/or predefined. In some instances, the first radio may be a Thread radio and the second radio may be a Wi-Fi radio.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 24:
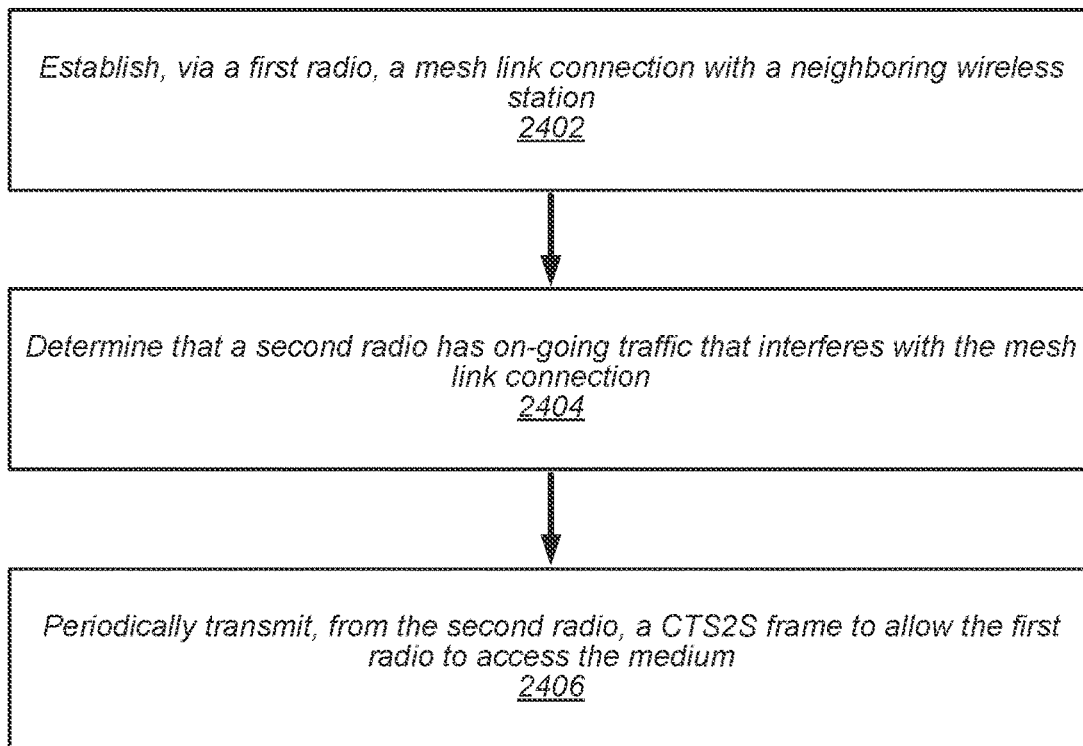

Turning to FIG. 24, at 2402, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2404, the wireless station may determine that a second radio of the one or more radios has on-going traffic that interferes with the mesh link connection.

At 2406, the wireless station may periodically transmit, from the second radio, a clear-to-send-to-self (CTS2S) frame to allow the first radio to access the medium. The CTS2S frame may generate an unsolicited grant period for the first radio. In some instances, the first radio may be a Thread radio and the second radio may be a Wi-Fi radio.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 25:
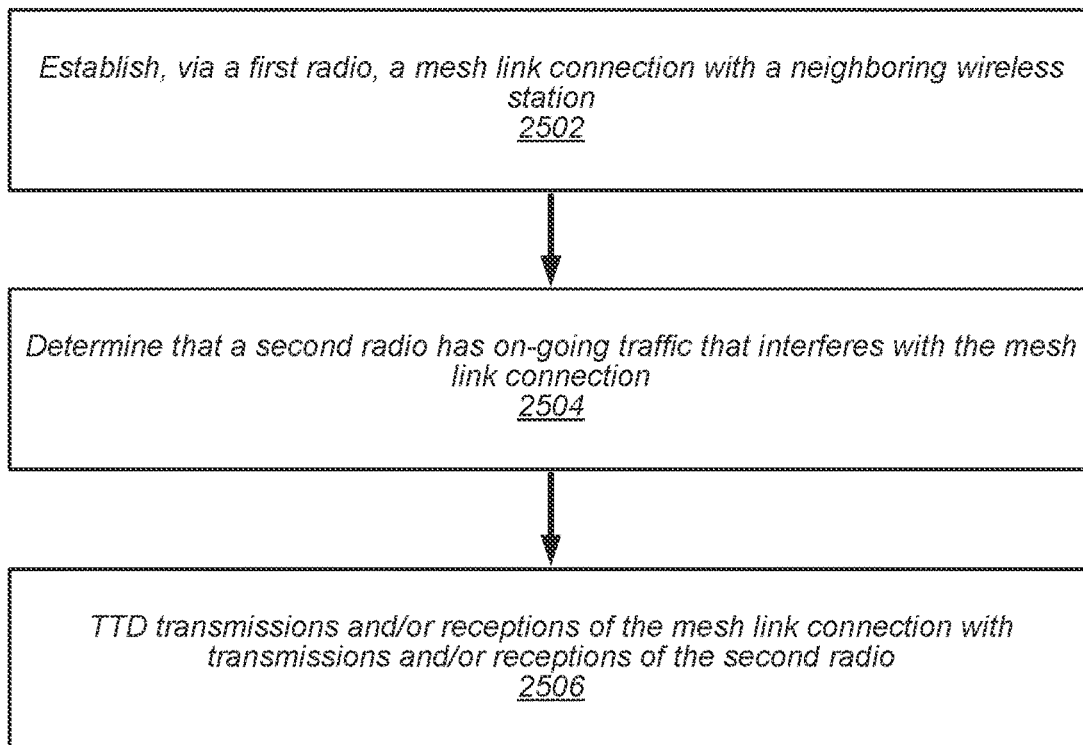

Turning to FIG. 25, at 2502, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2504, the wireless station may determine that a second radio of the one or more radios has on-going traffic that interferes with the mesh link connection.

At 2506, the wireless station may time division duplex transmissions and/or receptions of the mesh link connection with transmissions and/or receptions of the second radio. In some instances, transmissions and/or receptions of the mesh link connection may be aligned with idle time of the second radio. In some instances, a subset of transmissions and/or receptions of the second radio may be periodically suppressed to generate an unsolicited grant period for the first radio. In some instances, the first radio may be a Thread radio and the second radio may be a Wi-Fi radio.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, bandwidth key performance indicators (KPIS) for devices connected to the wireless station, latency KPIS for the devices connected to the wireless station, dynamic Wi-Fi link quality measurements (LQMs), and/or dynamic Bluetooth LQMs, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

Figure 26:
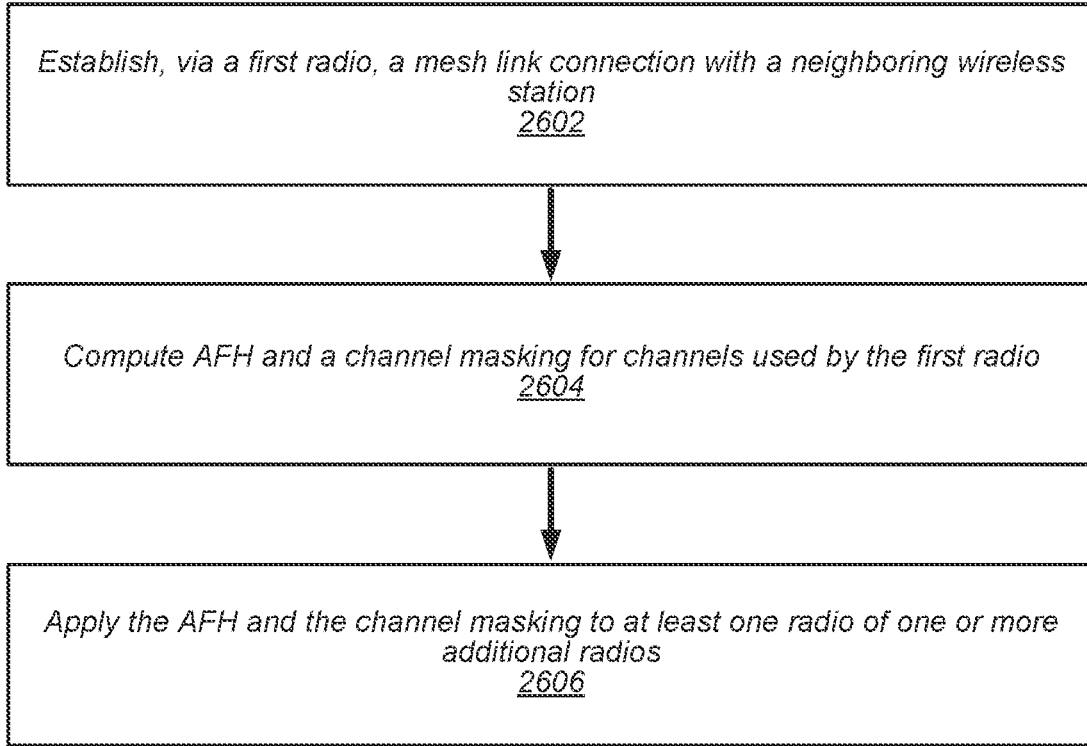

Turning to FIG. 26, at 2602, a wireless station, such as wireless station 106 and/or access point 112, may establish a mesh link connection with a neighboring wireless station, which may also be a wireless station 106 and/or an access point 112. The mesh link connection may be established via a first radio of the wireless station. The first radio may operate according to a first RAT, such as Thread. The first RAT may be associated with a first frequency range. The wireless station may be configured with one or more additional radios, as well. The one or more additional radios may operate according to one or more additional RATs, such as Wi-Fi and/or Bluetooth. The one or more additional RATs may also be associated with the first frequency range. Note that the wireless station may be configured as a Thread router and/or Thread end device. Note further that the neighboring wireless station may be configured as a Thread router and/or a Thread end device.

At 2604, the wireless station may compute active frequency hopping (AFH) and a channel masking for channels used by the first radio.

At 2606, the wireless station may apply the AFH and the channel masking to at least one radio of the one or more additional radios. In addition, the wireless station may determine a start of activity on at the least one radio and increase an energy detection threshold associated with the first radio. Note that increasing the energy detection threshold may increase a likelihood that the first radio determines a medium is busy or congested. In some instances, the wireless station may determine an end of activity on the at least one radio and decrease the energy detection threshold associated with the first radio. Note that decreasing the energy detection threshold may decrease a likelihood that the first radio determines a medium is busy or congested.

In some instances, to establish the mesh link connection with the neighboring wireless station, the wireless station may receive a mesh link establishment request from the neighboring wireless station and determine, based, at least in part, on connection data for the one or more additional radios, a response configuration. The response configuration may include any, any combination of, and/or all of (e.g., at least one of and/or one or more of) the wireless station transmitting a mesh link establishment response that includes a confidence factor in a vendor TLV to the neighboring wireless station, waiting for a retransmission of the mesh link establishment request before transmitting a mesh link establishment response to the neighboring wireless station, and/or transmitting an adjusted link quality metric in a mesh link establishment response to the neighboring wireless station. In some instances, the connection data for the one or more additional radios may include any, any combination of, and/or all of (e.g., at least one of and/or one or more of) a number of active services and/or a number of active connections. In some instances, the connection data may include and/or may further include any, any combination of, and/or all of (e.g., at least one of and/or one or more of) a number of devices connected to the wireless station, a bandwidth key performance indicator (KPIS) for a device connected to the wireless station, a latency KPIS for the device connected to the wireless station, a dynamic Wi-Fi link quality measurement (LQM), and/or a dynamic Bluetooth LQM. The connection to the device connected to the wireless station may include any, any combination of, and/or all of (e.g., at least one of and/or one or more of) a Thread connection, a Wi-Fi connection, and/or a Bluetooth connection. The confidence factor may map to a value of 0 to 10 in the vendor TLV. In addition, the confidence factor may have an integer value in the range of −5 to 0. Further, the vendor TLV may include 16 bits for a vendor identifier and 16 bits for vendor data. In such instances, bits 4, 5, 6, and 7 of the vendor data may indicate the confidence factor.

In some instances, when the response configuration includes the wireless station waiting for a retransmission, from the neighboring wireless station, of the mesh link establishment request before transmitting a mesh link establishment response, the wireless station may receive, from the neighboring wireless station, the retransmission of the mesh link establishment request and transmit, to the neighboring wireless station, a mesh link establishment response. The retransmission of the mesh link establishment request may be received after a delay period. The delay period may be pre-configured and/or specified. In addition, the mesh link establishment response may initiate a mesh link connection with the neighboring wireless station.

In some instances, when the response configuration includes the wireless station transmitting, to the neighboring wireless station, the adjusted link quality metric in the mesh link establishment response, the wireless station may determine, based, at least in part, on the connection data, to deter establishment of mesh links and adjust a link quality metric, e.g., such as by using a link margin offset to generate the adjusted link quality metric.

In some instances, to establish the mesh link connection with the neighboring wireless station, the wireless station may transmit mesh link establishment requests to a plurality of neighboring wireless stations and receive, from the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In addition, the wireless station may determine, based, at least in part, on a first confidence factor associated with the neighboring wireless station, to connect to the neighboring wireless station. In some instances, the first confidence factor may be based, at least in part, on connection data of the neighboring wireless station. The connection data may include information associated with the first RAT and information associated with the one or more additional RATs. Further, the connection data may include connection data for one or more radios of the neighboring wireless station and the connection data for the one or more radios may include any, any combination of, and/or all of (e.g., at least one of and/or one or more of) a number of active services or a number of active connections of the neighboring wireless station. In some instances, the connection data may include any, any combination of, and/or all of (e.g., at least one of and/or one or more of) a number of devices connected to the neighboring wireless station, bandwidth key performance indicators (KPIS) for devices connected to the neighboring wireless station, latency KPIS for the devices connected to the neighboring wireless station, dynamic Wi-Fi link quality measurements (LQMs), and/or dynamic Bluetooth LQMs. In some instances, connections to the devices connected to the neighboring wireless station may include any, any combination of, and/or all of (e.g., at least one of and/or one or more of) Thread connections, Wi-Fi connections, and/or Bluetooth connections.

In some instances, the wireless station may transmit, to the neighboring wireless station, a mesh link child identifier request and receive, from the neighboring wireless station, a mesh link child identifier response. Note that by transmitting, to the neighboring wireless station, the mesh link child identifier, the wireless station may initiate the mesh link connection with the neighboring wireless station.

In some instances, to establish the mesh link connection with the neighboring wireless station, the wireless station may transmit mesh link establishment requests to a plurality of neighboring wireless stations and receive, from a subset of the plurality of neighboring wireless stations, mesh link establishment responses that include confidence factors in vendor TLVs. Note that each confidence factor may be associated with a respective neighboring wireless station of the plurality of wireless stations. In some instances, each confidence factor may map to a value of 0 to 10 in the vendor TLV. Further, each confidence factor may have an integer value in the range of −5 to 0. Additionally, the vendor TLV may include 16 bits for a vendor identifier and 16 bits for vendor data and bits 4, 5, 6, and 7 of the vendor data may indicate the confidence factor. In some instances, for each neighboring wireless station of the subset of neighboring wireless stations, a confidence factor may be based, at least in part, on connection data. The connection data may include information associated with the first RAT and information associated with the one or more additional RATs. Further, the connection data may include connection data for one or more radios and the connection data for the one or more radios may include any, any combination of, and/or all of (e.g., at least one of and/or one or more of) a number of active services or a number of active connections. In some instances, the connection data may include any, any combination of, and/or all of (e.g., at least one of and/or one or more of) a number of connected devices, bandwidth key performance indicators (KPIS) for connected devices, latency KPIS for the connected devices, dynamic Wi-Fi link quality measurements (LQMs), and/or dynamic Bluetooth LQMs. In some instances, connections to the connected devices may include any, any combination of, and/or all of (e.g., at least one of and/or one or more of) Thread connections, Wi-Fi connections, and/or Bluetooth connections. Additionally, the wireless station may, in response to determining that none of the subset of the plurality of neighboring wireless stations are appropriate for connection, retransmit, to the neighboring wireless station (e.g., which did not send a mesh link establishment response), the mesh link establishment request. In some instances, the wireless station may wait a delay period prior to retransmitting the mesh link establishment request. The delay period may be pre-configured and/or specified. In some instances, the wireless station may receive, from the neighboring wireless station, a mesh link establishment response. Note that the mesh link establishment response may initiate the mesh connection between the wireless station and the neighboring wireless station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least two radios; and
   at least one processor in communication with the at least two radios and configured to cause the wireless station to:
      establish a mesh link connection with a neighboring wireless station via a first radio of the at least two radios that is configured to operate according to a first radio access technology (RAT), wherein establishment of the mesh link connection is based, at least in part, on connection data of the neighboring wireless station, and wherein the connection data comprises information associated with the first RAT and information associated with one or more additional RATs; and
      deny at least one reception request for the mesh link connection based, at least in part, on determining that a mode of operation of a second radio of the at least two radios is a critical mode of operation.

2. The wireless station of claim 1,
   wherein the critical mode of operation includes one or more Wi-Fi calibration, Wi-Fi low data rate, and/or Wi-Fi low latency.

3. The wireless station of claim 1,
   wherein the at least one processor is further configured to cause the wireless station to:
      utilize a retry mechanism to maintain performance of the mesh link connection.

4. The wireless station of claim 3,
   wherein the retry mechanism requires a threshold number of reception requests for the wireless station to accept the reception request for the mesh link connection.

5. The wireless station of claim 1,
   wherein to establish the mesh link connection with the neighboring wireless station, the at least one processor is configured to cause the wireless station to:
      transmit mesh link establishment requests to a plurality of neighboring wireless stations;
      receive, from the plurality of neighboring wireless stations, mesh link establishment responses that include confidence factors; and
      determine, based, at least in part, on a first confidence factor associated with the neighboring wireless station, to connect to the neighboring wireless station, wherein the first confidence factor is based, at least in part, on the connection data.

6. The wireless station of claim 1,
   wherein the connection data further comprises connection data for one or more radios of the neighboring wireless station and the connection data for the one or more radios comprises at least one of a number of active services supported by the neighboring wireless station or a number of active connections of the neighboring wireless station.

7. A non-transitory computer readable memory medium storing program instructions executable by processing circuitry to cause a wireless station to:
   establish a mesh link connection with a neighboring wireless station via a first radio of at least two radios that is configured to operate according to a first radio access technology (RAT), wherein establishment of the mesh link connection is based, at least in part, on connection data of the neighboring wireless station, and wherein the connection data comprises information associated with the first RAT and information associated with one or more additional RATs; and
   deny at least one reception request for the mesh link connection based, at least in part, on determining that a mode of operation of a second radio of the at least two radios is a critical mode of operation.

8. The non-transitory computer readable memory medium of claim 7,
   wherein the critical mode of operation includes one or more Wi-Fi calibration, Wi-Fi low data rate, and/or Wi-Fi low latency.

9. The non-transitory computer readable memory medium of claim 7,
   wherein the program instructions are further executable by the processing circuitry to cause the wireless station to:
      utilize a retry mechanism to maintain performance of the mesh link connection.

10. The non-transitory computer readable memory medium of claim 9,
    wherein the retry mechanism requires a threshold number of reception requests for the wireless station to accept the reception request for the mesh link connection.

11. The non-transitory computer readable memory medium of claim 7,
    wherein, to establish the mesh link connection with the neighboring wireless station, the program instructions are further executable by the processing circuitry to cause the wireless station to:
       transmit mesh link establishment requests to a plurality of neighboring wireless stations;
       receive, from a subset of the plurality of neighboring wireless stations, mesh link establishment responses that include confidence factors; and
       in response to determining that none of the subset of the plurality of neighboring wireless stations are appropriate for connection, retransmit, to the neighboring wireless station, a mesh link establishment request.

12. The non-transitory computer readable memory medium of claim 11,
wherein the program instructions are further executable to cause the wireless station to:
wait a delay period prior to retransmitting the mesh link establishment request to the neighboring wireless station.

13. The non-transitory computer readable memory medium of claim 11,
wherein the program instructions are further executable to cause the wireless station to:
receive, from the neighboring wireless station, a mesh link establishment response.

14. An apparatus, comprising:
a memory; and
at least one processor in communication with the memory and configured to:
establish a mesh link connection with a neighboring wireless station via a first radio of at least two radios in communication with the at least one processor, wherein establishment of the mesh link connection is based, at least in part, on connection data of the neighboring wireless station, and wherein the connection data comprises information associated with a first radio access technology (RAT) and information associated with one or more additional RATs; and
deny at least one reception request for the mesh link connection based, at least in part, on determining that a mode of operation of a second radio of the at least two radios is a critical mode of operation.

15. The apparatus of claim 14,
wherein the critical mode of operation includes one or more Wi-Fi calibration, Wi-Fi low data rate, and/or Wi-Fi low latency.

16. The apparatus of claim 14,
wherein the at least one processor is further configured to:
utilize a retry mechanism to maintain performance of the mesh link connection.

17. The apparatus of claim 16,
wherein the retry mechanism requires a threshold number of reception requests for the wireless station to accept the reception request for the mesh link connection.

18. The apparatus of claim 14,
wherein, to establish the mesh link connection with the neighboring wireless station, the at least one processor is configured to:
generate instructions to transmit, to the neighboring wireless station, a mesh link child identifier request that initiates the mesh link connection with the neighboring wireless; and
receive, from the neighboring wireless station, a mesh link child identifier response.

19. The apparatus of claim 14,
wherein the first RAT comprises Thread, and wherein the one or more additional RATs comprise one or more of Wi-Fi or Bluetooth.

20. The wireless station of claim 1,
wherein the first RAT comprises Thread and is associated with a first frequency range, and wherein the one or more additional RATs are associated with the first frequency range.

\* \* \* \* \*